United States Patent
Xu et al.

(10) Patent No.: US 12,354,628 B1
(45) Date of Patent: Jul. 8, 2025

(54) HYBRID PLASMONIC BOTTOM LAYER FOR INCREASED NEAR FIELD TRANSDUCER RELIABILITY

(71) Applicant: Headway Technologies, Inc., Milpitas, CA (US)

(72) Inventors: Weihao Xu, San Jose, CA (US); Tobias Maletzky, San Jose, CA (US); Shigeki Tanemura, Sunnyvale, CA (US); Ken Fujii, San Jose, CA (US); Weisheng Hu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/587,570

(22) Filed: Feb. 26, 2024

(51) Int. Cl.
| | |
|---|---|
| *G11B 5/31* | (2006.01) |
| *G11B 5/187* | (2006.01) |
| *G11B 5/60* | (2006.01) |
| *G11B 13/08* | (2006.01) |
| G11B 5/00 | (2006.01) |

(52) U.S. Cl.
CPC ............. *G11B 5/314* (2013.01); *G11B 5/187* (2013.01); *G11B 5/6088* (2013.01); *G11B 13/08* (2013.01); G11B 2005/0021 (2013.01)

(58) Field of Classification Search
None
See application file for complete search history.

(56) References Cited

U.S. PATENT DOCUMENTS

| | | | |
|---|---|---|---|
| 8,509,037 B1* | 8/2013 | Huang | G11B 5/314 360/59 |
| 8,514,673 B1* | 8/2013 | Zhao | G11B 13/08 369/13.33 |
| 10,262,683 B2 | 4/2019 | Staffaroni et al. | |
| 11,657,844 B1* | 5/2023 | Lee | G11B 5/7375 360/59 |
| 11,710,506 B1* | 7/2023 | Peng | G11B 5/6088 369/13.33 |
| 2010/0202256 A1* | 8/2010 | Ito | G11B 5/314 360/59 |
| 2014/0355399 A1* | 12/2014 | Huang | G11B 5/3116 369/13.17 |
| 2015/0340052 A1* | 11/2015 | Sankar | G11B 5/4866 216/53 |
| 2016/0351211 A1* | 12/2016 | Blaber | G11B 5/6082 |
| 2018/0040342 A1* | 2/2018 | Goggin | G11B 5/6088 |

(Continued)

*Primary Examiner* — Peter Vincent Agustin
(74) *Attorney, Agent, or Firm* — DLA Piper LLP (US)

(57) ABSTRACT

The present embodiments relate to a near field transducer for thermally-assisted magnetic recording (TAMR) with a hybrid plasmonic bottom layer. In a first example embodiment, a thermally-assisted magnetic recording (TAMR) write head is provided. The TAMR write head can include a main pole and a near field transducer (NFT). The NFT can include a first layer and a second layer. The first layer can include a first plasmonic material (e.g., rhodium, iridium, platinum). Further, the first layer can be disposed adjacent to the heat sink. The second layer can include a portion of a second plasmonic material (e.g., gold) and a first plasmonic portion (e.g., comprising rhodium). The first plasmonic portion of the second layer can be disposed adjacent to the ABS. The hybrid second layer (e.g., plasmonic bottom layer) can provide an improved NFT reliability during TAMR writing.

18 Claims, 19 Drawing Sheets

(56) References Cited

U.S. PATENT DOCUMENTS

| | | | | |
|---|---|---|---|---|
| 2019/0198053 A1* | 6/2019 | Krichevsky | ............ | G11B 5/127 |
| 2021/0335386 A1* | 10/2021 | Peng | ...................... | G11B 5/314 |
| 2022/0051694 A1* | 2/2022 | Zhao | .................... | G11B 5/3163 |
| 2022/0415354 A1* | 12/2022 | Cheng | .................... | G11B 5/314 |

* cited by examiner

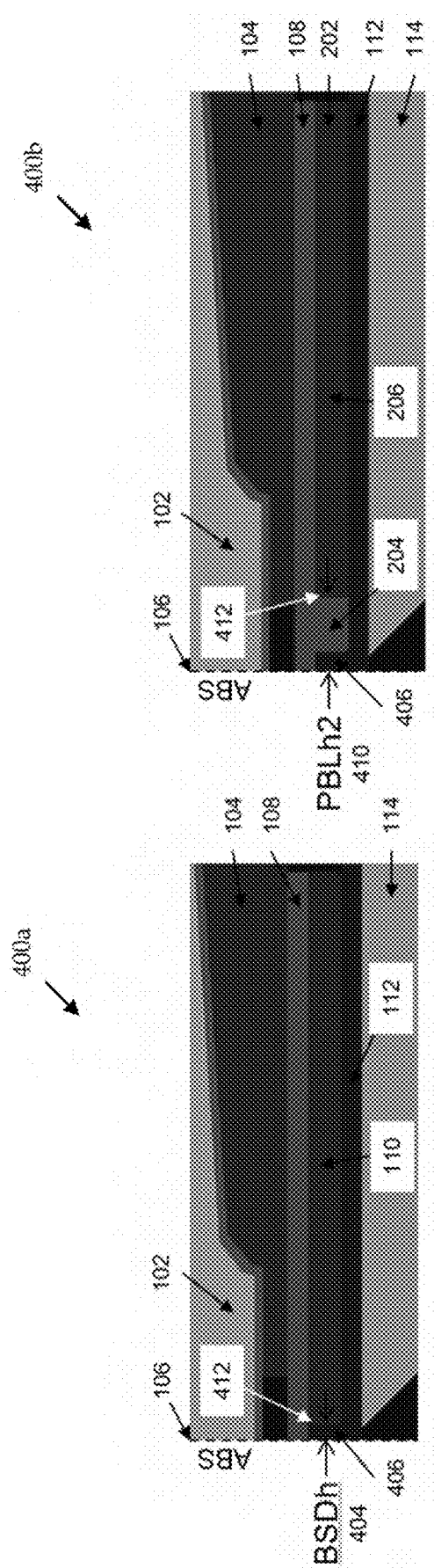

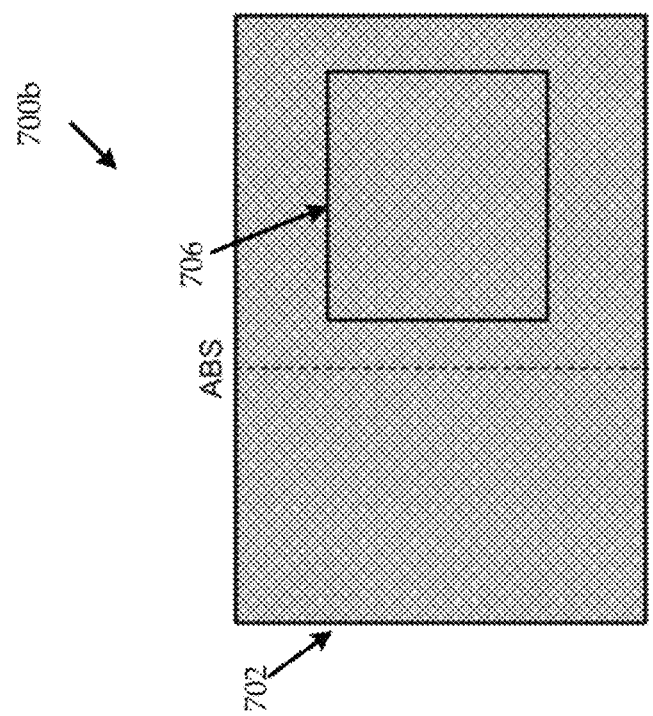
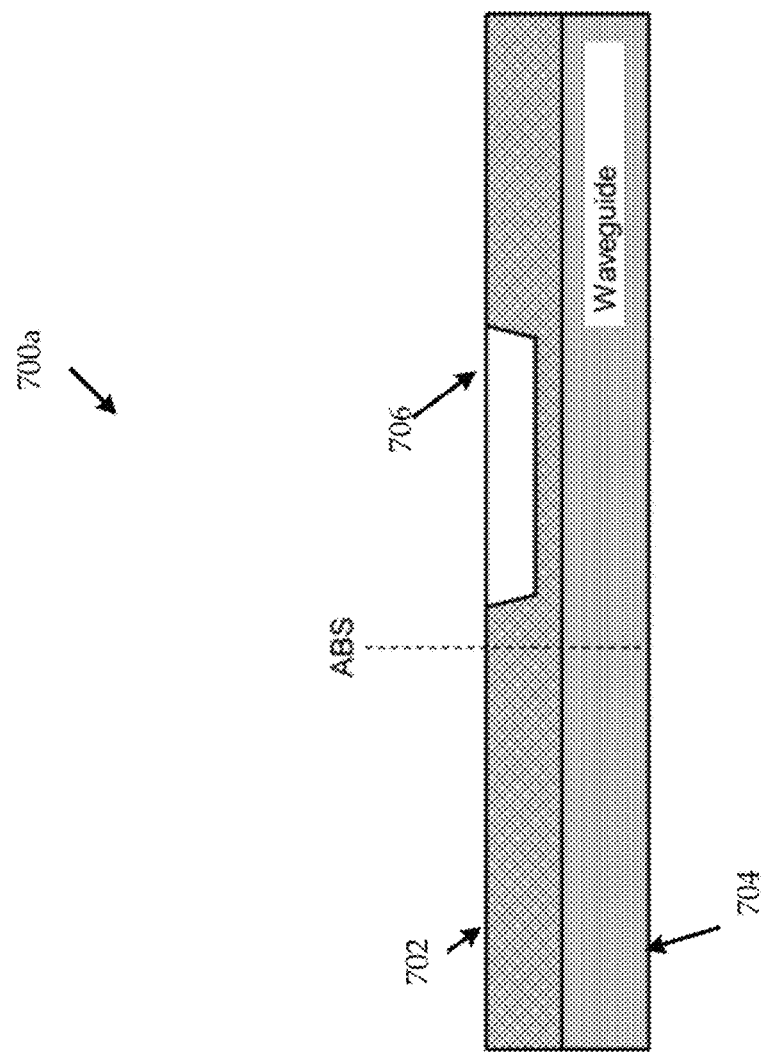
FIG. 7B
FIG. 7A

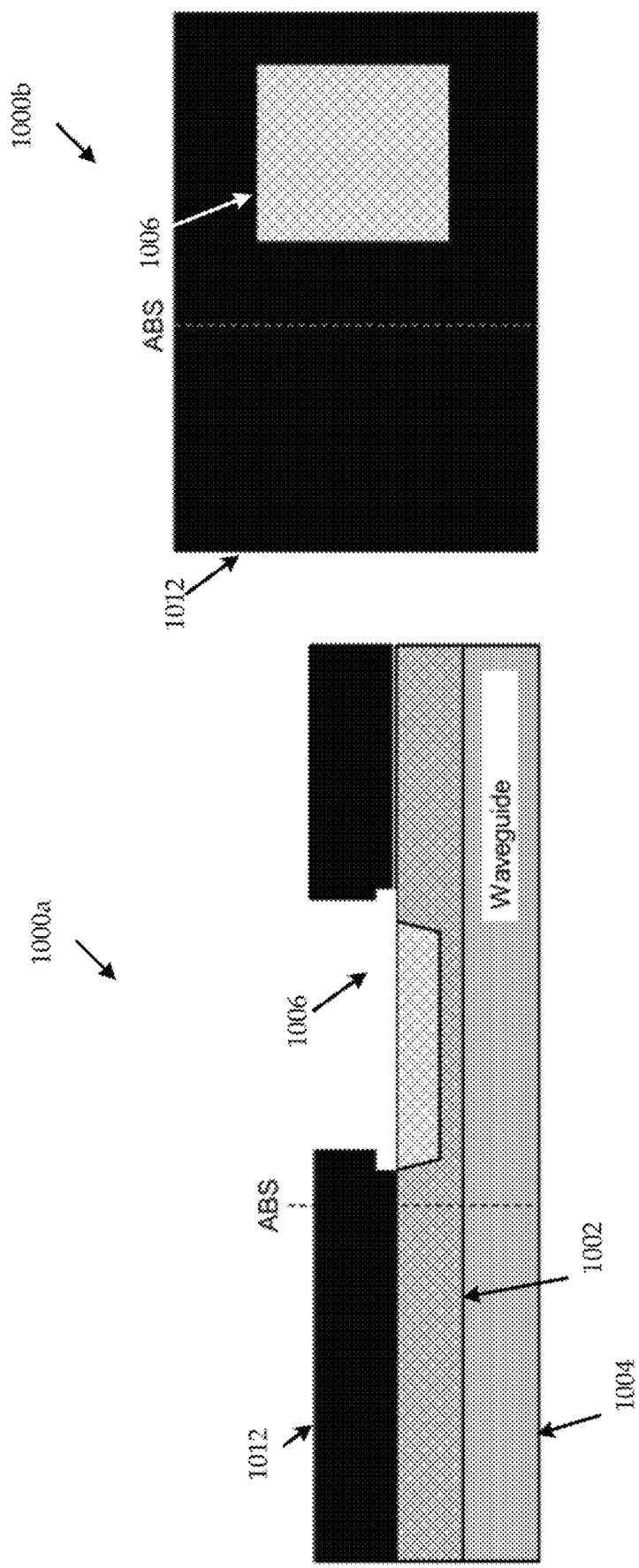

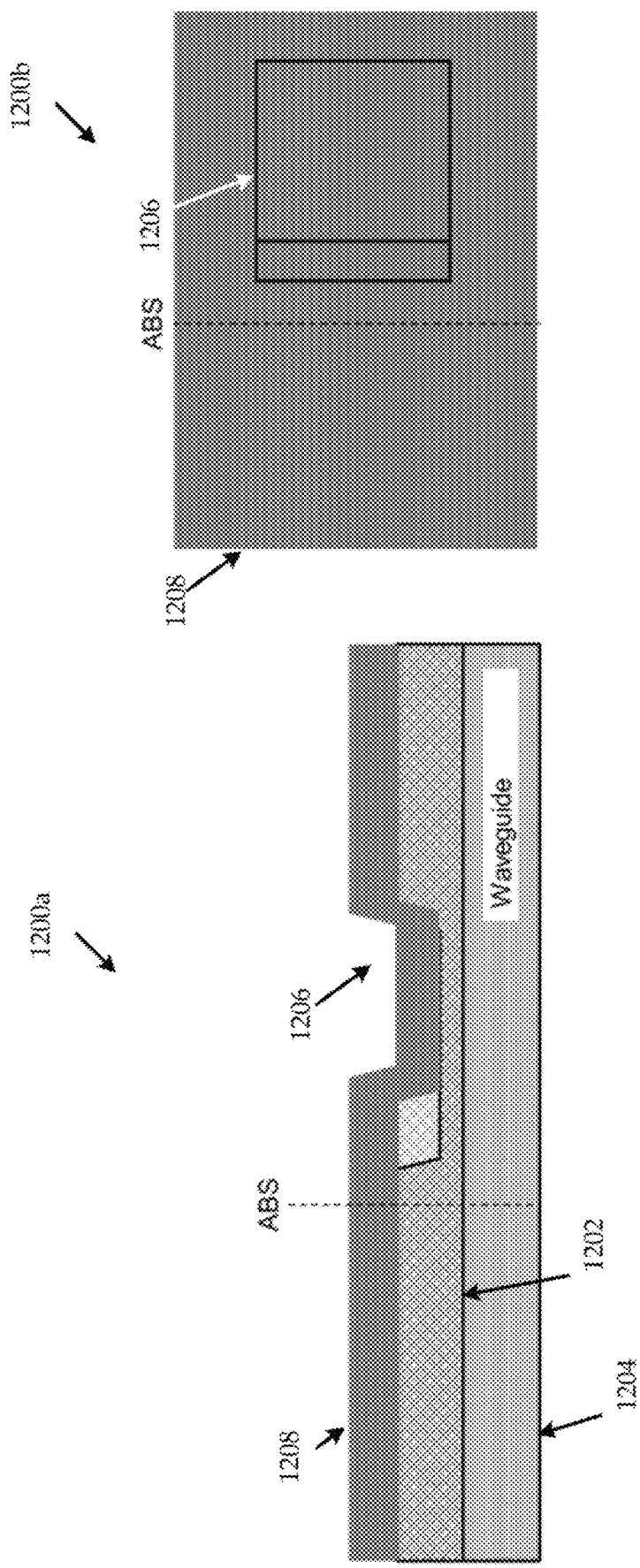

HYBRID PLASMONIC BOTTOM LAYER FOR INCREASED NEAR FIELD TRANSDUCER RELIABILITY

TECHNICAL FIELD

Embodiments of the invention relate to the field of electro-mechanical data storage devices. More particularly, embodiments of the invention relate to the field of a near field transducer (NFT) structure of a thermally assisted magnetic recording (TAMR) device with a hybrid plasmonic bottom layer (PBL) portion.

BACKGROUND

A hard-disk drive (HDD) can include a non-volatile storage device that is housed in a protective enclosure and stores digitally encoded data on one or more circular disks having magnetic surfaces (a disk may also be referred to as a platter). When an HDD is in operation, each magnetic-recording disk can be rapidly rotated by a spindle system. Data can be written to a magnetic-recording disk using a write head which is positioned over a specific location of a disk. A write head can use a magnetic field to write data to the surface of a magnetic-recording disk.

In many cases, a write head can implement thermally assisted magnetic recording (TAMR) to interact with a magnetic recording medium (e.g., a disk). TAMR involves raising the temperature of a small region of the magnetic medium to near its Curie temperature where its coercivity and anisotropy are significantly reduced, and magnetic writing becomes easier to achieve even with weak write fields characteristic of small write heads in high recording density schemes. In TAMR, optical power from a light source can be converted into localized heating in a recording medium during a write process to temporarily reduce the field needed to switch the magnetizations of the medium grains. Thus, data storage density in a hard disk drive (HDD) in terms of thousands of tracks per inch (kTPI) can be further improved.

SUMMARY

The present embodiments relate to a near field transducer for a thermally-assisted magnetic recording (TAMR) with a hybrid plasmonic bottom layer. In a first example embodiment, a thermally-assisted magnetic recording (TAMR) write head is provided. The TAMR write head can include a main pole. The main pole can include a tip portion disposed adjacent to an air-bearing surface (ABS). The main pole can be configured to direct a magnetic field toward a magnetic recording medium to interact with the magnetic recording medium. The TAMR head can further include a heat sink disposed adjacent to the main pole.

The TAMR head can further include a near field transducer (NFT). The NFT can include a first layer and a second layer. The first layer can include a first plasmonic material (e.g., rhodium, iridium, platinum). Further, the first layer can be disposed adjacent to the heat sink.

The second layer can include a portion of a second plasmonic material (e.g., gold) and a first plasmonic portion (e.g., comprising rhodium). The portion of the first plasmonic material of the second layer can be disposed adjacent to the ABS.

In some instances, the NFT can include an alumina layer disposed between the waveguide and the second layer of the near field transducer. The alumina layer can include an etched recess recessed into the alumina layer. The etched recess can be etched into the alumina layer via an etching process (e.g., IBE).

In another example embodiment, a method for manufacturing a near field transducer that is part of a thermally-assisted magnetic recording (TAMR) write head is provided. The method can include disposing an alumina layer above a waveguide. The method can further include forming an etched recess in the alumina layer via an etching process. In some instances, the etching process comprises an ion beam etching (IBE) process.

The method can further include disposing a first plasmonic material in a first portion of the etched recess. In some instances, the method can further include disposing a photo-resist layer above the alumina layer. The photo-resist layer can define a length of the first layer. Further, the photo-resist layer can be removed, where the removing of the photo-resist layer removes part of the first plasmonic material remaining in the etched recess to expose the second portion of the etched recess.

The method can further include disposing a second plasmonic material in a second portion of the etched recess. The first plasmonic material and the second plasmonic material comprise a second layer of the near field transducer. Further, a portion of the full film of the second plasmonic material can be removed such that the second plasmonic material remains only in the second portion of the etched recess.

The method can further include disposing a first layer comprising the first plasmonic material above the alumina layer and the etched recess.

In some embodiments, a patterning mask can be disposed above the first layer. The patterning mask can define a final shape of the near field transducer. Further, a portion of the first layer not below the patterning mask can be removed.

Further, in some embodiments, the method can include disposing a cladding material adjacent to the first layer such that the first layer and the cladding material form a flat surface.

In another example embodiment, a near field transducer (NFT) is provided. The NFT can include a first layer comprising a first plasmonic material (e.g., rhodium, iridium, platinum). The first layer can be disposed adjacent to the heat sink. In some instances, the first layer is defined by a patterning mask added above the first layer. The patterning mask can define a final shape of the near field transducer.

The NFT can also include a second layer that can include a second plasmonic portion (e.g., comprising gold) and a first plasmonic portion (e.g., comprising rhodium, iridium, or platinum). The first plasmonic portion can be disposed adjacent to the ABS. The NFT can further include a waveguide.

In some instances, the write head can include an alumina layer disposed between the waveguide and the second layer of the near field transducer. The alumina layer can include an etched recess formed into the alumina layer via an etching process. The second layer can be disposed within the etched recess.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 4A is a cross-sectional view of a PBL according to some embodiments.

FIG. 4B is a cross-sectional view of a hybrid PBL according to some embodiments.

FIG. 7A is a cross-section view of a NFT with an alumina layer after an IBE etching of the alumina layer according to some embodiments.

FIG. 7B is a top view of a NFT with an alumina layer after an IBE etching of the alumina layer according to some embodiments.

FIG. 10A is a cross-section view of an NFT with a photoresist being patterned to define a final Rh length according to some embodiments.

FIG. 10B is a top view of an NFT with a photoresist being patterned to define a final Rh length according to some embodiments.

FIG. 12A is a cross-section view of an NFT with a full film Au layer being deposited on top of the alumina layer according to some embodiments.

FIG. 12B is a top view of an NFT with a full film Au layer being deposited on top of the alumina layer according to some embodiments.

DETAILED DESCRIPTION

A write head utilizing a thermally assisted magnetic recording (TAMR) technology can increase the amount of digital data capable of being stored on a magnetic recording medium (e.g., a disk) by temporarily heating the disk during writing. Heating the disk can make the disk more receptive to magnetic fields and allow for writing to smaller regions on the disk (thereby increasing the data storage capacity on the disk). Write heads utilizing TAMR are greatly increasing in popularity due to their ability to increase disk capacity. For example, TAMR can enable recording at 1~10 Tb/inch$^2$ data density.

Utilizing the temperature dependence of a magnetic coercivity, write heads using TAMR can convert optical power into localized heating of the magnetic recording medium to temporarily reduce the switching field needed to align the magnetizations of the medium grains. Sharp thermal gradients can translate into high magnetic gradients that can enable a higher data storage density than with other magnetic recording technologies. Further, the heat spot size may need to be smaller than the diffraction limit of light, plasmonic structures, also referred to as near field transducers (NFTs), can be used to deliver the desirable confinement of the optical heating.

A primary challenge in TAMR recording can be to improve the reliability of the recording head due to the high operating temperature during TAMR recording. For example, the temperature during TAMR recording can be around the Curie temperature of an iron-platinum material (e.g., FePt with a Curie temperature ~420° C.).

Figure 1A:
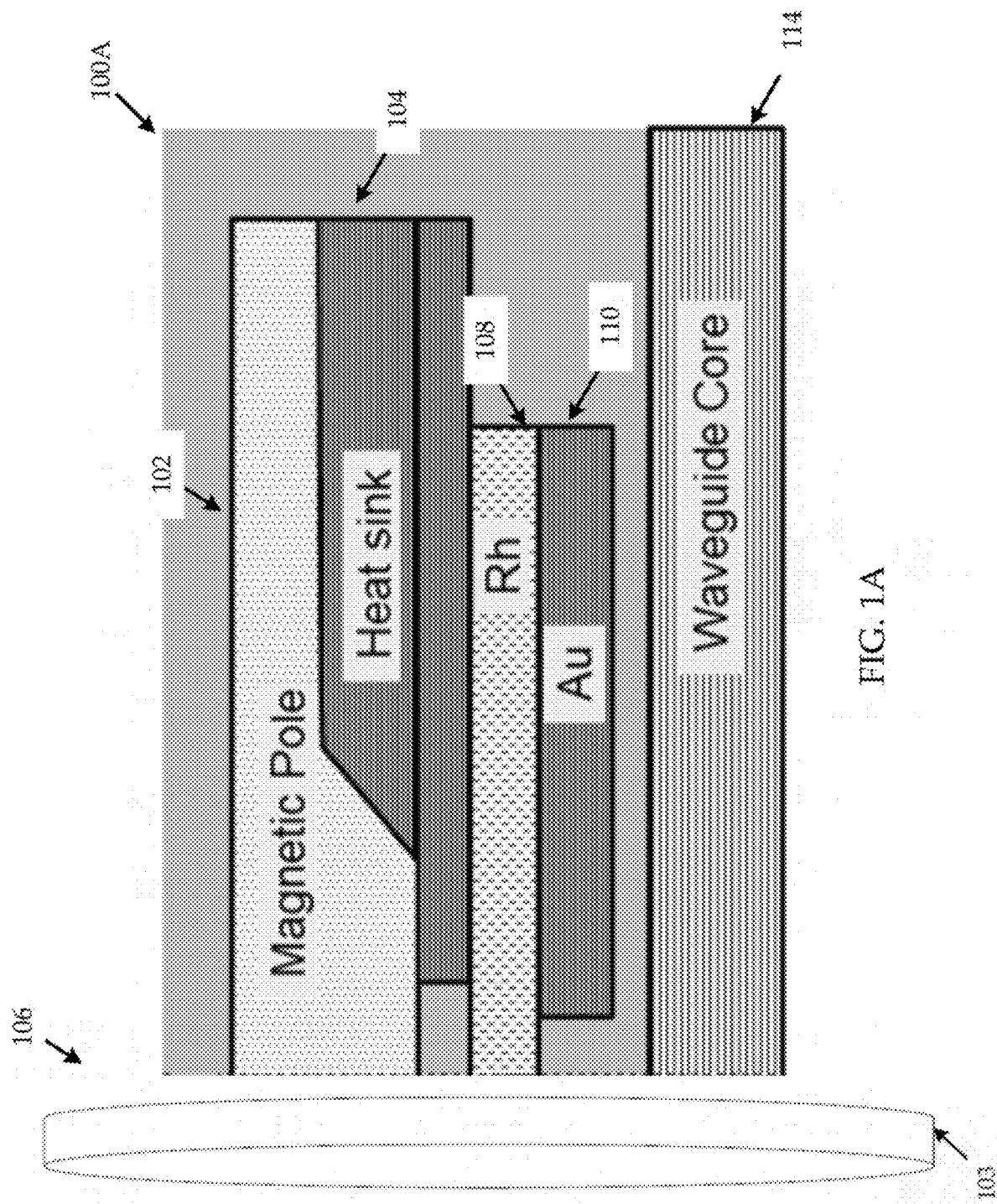
FIGS. 1A-B are cross-section views of an example self-aligned gold-rhodium (Au—Rh) bi-layer structure for a write head according to some embodiments.
Figure 1B:
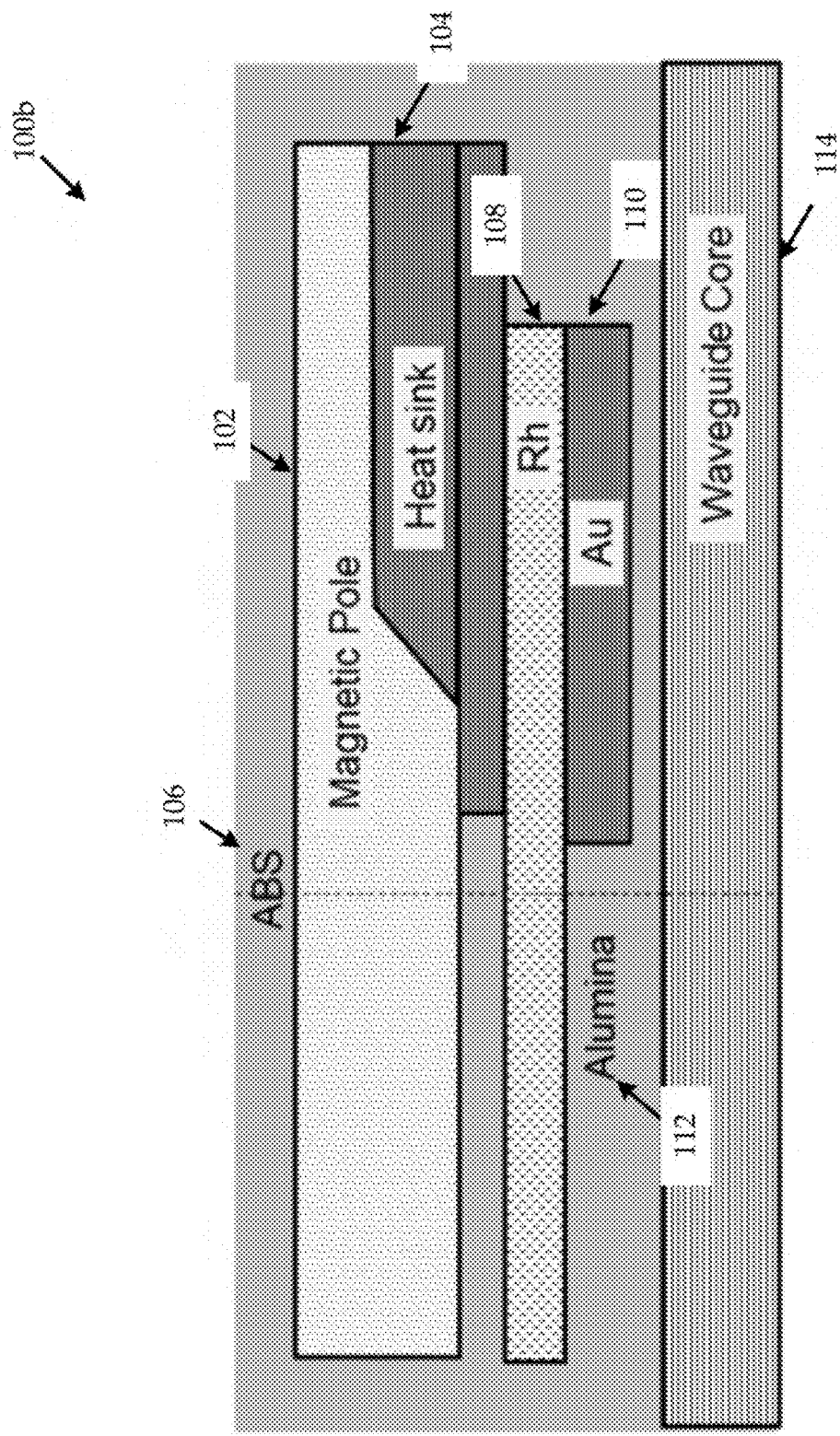

FIGS. 1A-B are cross-section views of an example self-aligned gold-rhodium (Au—Rh) bi-layer structure for a write head 100a-b. As shown in FIGS. 1A-1B, a magnetic pole 102 can be disposed adjacent to a heat sink 104. A portion of the magnetic pole 102 can be disposed at an air-bearing surface 106.

The write head 100 can further include a rhodium (Rh) layer 108 and a gold (Au) layer 110. Rh layer 108 can be disposed adjacent to the heat sink 104. Rh layer 108 and Au layer 110 can form a bi-layer structure as described herein. The write head 100 can also include an alumina (e.g., aluminum oxide) layer 112 and a waveguide core 114. The write head as shown in FIG. 1A-B can have good optical properties in the bottom layer (e.g., Au layer 110) and robust materials in the top layer (e.g., Rh layer 108) such as platinum (Pt), rhodium (Rh), and iridium (Ir). The bottom layer can serve as a plasmon generator transferring the light power from the waveguide mode into the plasmon mode. Further, the top layer, which can act as an antenna at the ABS transferring the power into the medium, can be more reliable under the high temperature ABS-environments during the TAMR writing process.

However, in many cases, densification of the bottom layer (e.g., Au layer 110) may still occur during TAMR writing. This densification can lead to a recession of the bottom layer from the ABS, which can cause a reduction of NFT efficiency. This can reduce the temperature in the medium below a critical recording temperature, which can result in grains not being aligned with the writer's magnetic field.

The present embodiments relate to a Near Field Transducer (NFT) for use in a TAMR write head. Particularly, the NFT as described herein can include a dual metal plasmonic bottom layer (PBL) also referred to as hybrid PBL for the NFT. Additionally, the present embodiments provide methods for building the NFT as described herein.

The NFT can include a bottom layer (e.g., a plasmon generator). The bottom layer can include a material such as a hybrid Rh/Au (or Ir/Au, Pt/Au, etc.). The bottom layer can be disposed adjacent to a dielectric waveguide. The NFT can also include a top layer comprising a highly thermo-mechanically stable material such as Rh, disposed above the bottom layer and disposed closer to the heat sink. The NFT can further include a peg region with small cross-track and down-track dimension at the Air Bearing Surface (ABS).

Figure 2:
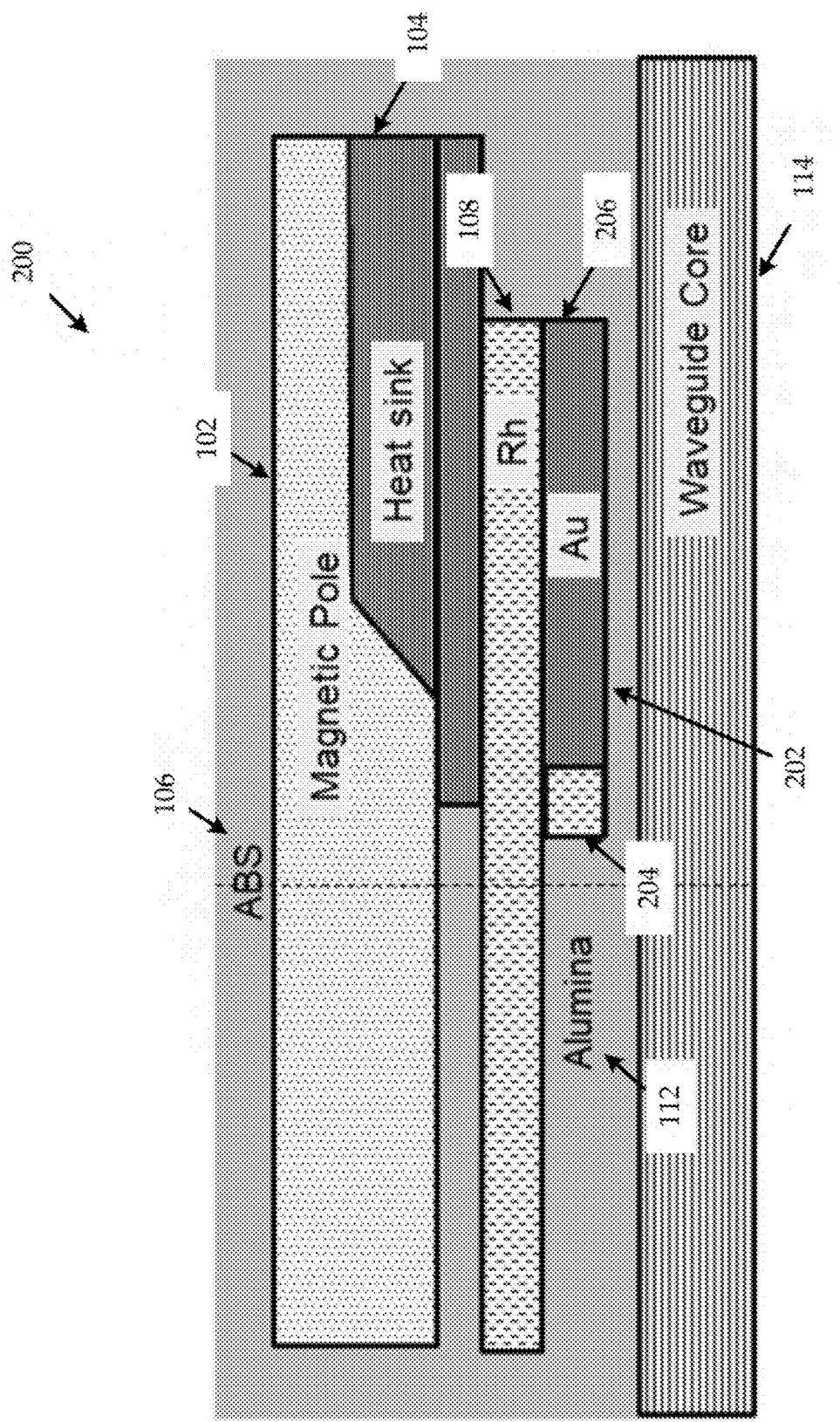
FIG. 2 is a cross-section view of a write head with a hybrid PBL NFT according to some embodiments.

FIG. 2 is a cross-section view of a write head 200 with a hybrid PBL NFT. As shown in FIG. 2, the write head 200 can include a bottom layer 202 disposed adjacent to the waveguide core 114. The bottom layer 202 can include both a first portion 204 and a second portion 206. The bottom layer can include a hybrid material, such as Rh/Au, Ir/Au, or Pt/Au, for example. For instance, the first portion 204 can include Rh and the second portion 206 can include Au. The write head 200 can further include a top layer 108 comprising Rh and disposed adjacent to the heat sink 106.

In many cases, a TAMR NFT structure (e.g., structure 100 in FIG. 1) can comprise an Au-only PBL. The PBL can recess from the ABS at a high temperature during TAMR recording. The hybrid PBL configuration as described herein can overcome the deficiencies of many PBL structures by utilizing multiple materials in the PBL. The PBL can include a low optical loss but less thermo-mechanically stable material, such as Au, in the cooler region away from the ABS, and a thermo-mechanically stable material such as Rh or Ir in the hotter region near the ABS. Such a combination can provide higher reliability while maintaining similar optical conversion efficiency from the waveguide mode to the surface plasmon mode at the PBL.

Figure 3B:
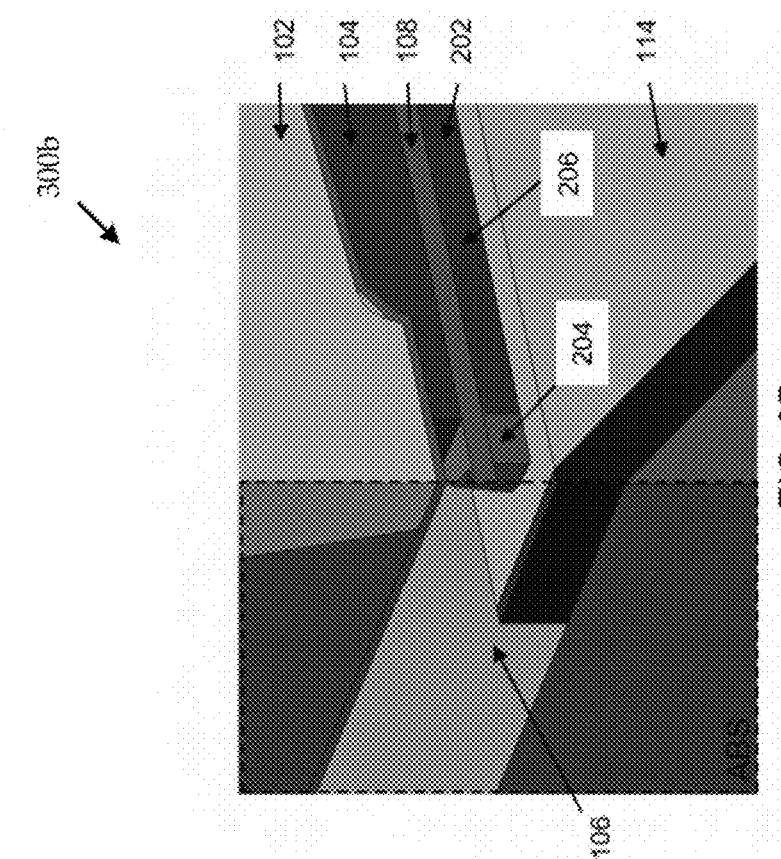
FIG. 3B illustrates a 3D, half-model representation of a hybrid PBL as part of a write head according to some embodiments.
Figure 3A:
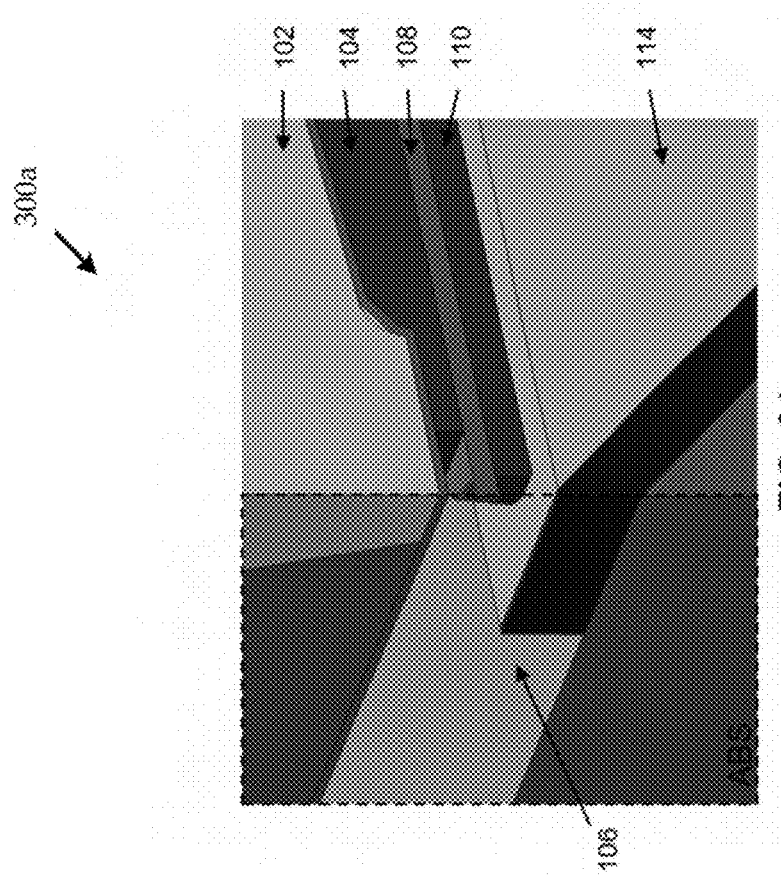
FIG. 3A illustrates a 3D, half-model representation of a PBL as part of a write head according to some embodiments.

FIGS. 3A-3B illustrate three-dimensional half-model views 300A-B of a PBL layer. In many cases, a PBL 110 can include Au, as is shown in FIG. 3A. In these cases, the Au of the PPG bottom layer (PBL) may be recessed only around 30 nm from the ABS 106. The PBL may be close to the peg, which can include a hot spot in the head during writing. Further, in the high temperature environment, recession of the PBL from the ABS can be observed.

In FIG. 3B, the PBL 202 can include a hybrid PBL comprising Au (e.g., 204A) and Rh (e.g., 204B). A planar plasmon generator (PPG) and the peg can be disposed near the ABS 106. For example, the PBL can include a first portion 206 (e.g., comprising Au) and a second portion 204 (e.g., comprising Rh). The PBL 202 in FIG. 3B can move the Au portion away from the high temperature region near the ABS to a lower temperature region away from the ABS.

FIGS. 4A-4B illustrate cross-sectional views 400A-B of a PBL. As shown in FIG. 4A, the PBL can include an Au portion 110. A BSDh 404 can define a thickness of a dielectric film 406 in front of the Au portion 110.

FIG. 4B illustrates a hybrid PBL. The hybrid PBL can include an Au portion 206 and a Rh portion 208 connected to the Au portion 206. The Rh portion 204 can be disposed near the ABS. PBLh2 410 defines the recession of the Au portion 206 from the ABS. The maximum Au temperature at location 412 is lower in the hybrid PBL than in the PBL structure of FIG. 4A.

FIGS. 5A-5D provide graphical illustrations of the comparison of a single material PBL (FIG. 4A) and a hybrid PBL (FIG. 4B). In the case of the hybrid PBL, PBLh2 is varied while BSDh is held at 30 nm. In case of single material PBL, BSDh is varied. The figures represent metrics at optimized laser currents (Ieff) at 650 kilo track per inch KTPI (including a 10% margin).

Figures 5A, 5B:
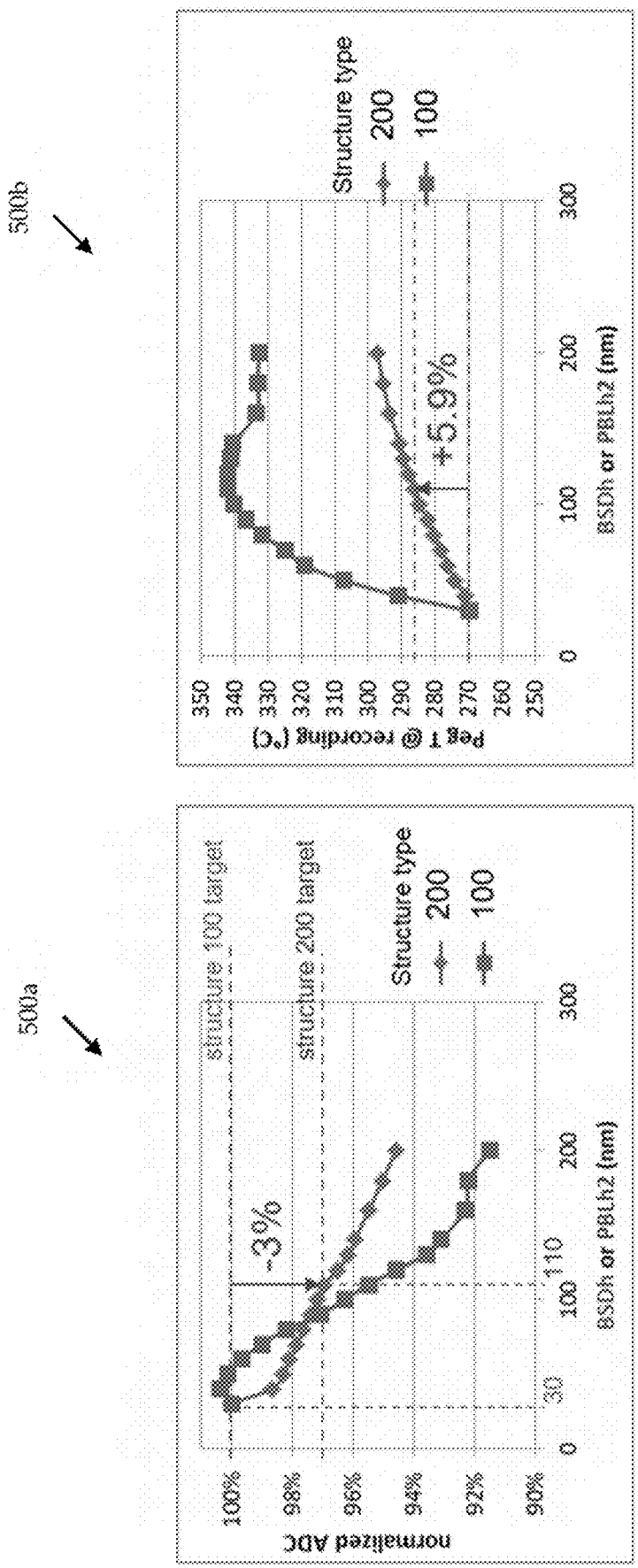
FIG. 5A illustrates the ADC for a write head with hybrid PBL as described herein compared to the ADC of a single material PBL write head for varying values of BSDh and PBLh2 according to some embodiments.
FIG. 5B is a graphical representation of a peg temperature at the recording point for varying values of BSDh and PBLh2 according to some embodiments.

FIG. 5A is a graphical representation 500a of a normalized areal density capability (ADC) for varying values of the BSDh for the single material PBL structure and PBLh2 for the hybrid PBL structure. As shown in FIG. 5A, a first series of points 502a, 502b can include values for a BSDh with a first trendline 504 specifying a trend of values. Further, a second series of points 506a, 506b can include values for a PBLh2 with a second trendline 508 specifying a trend of values. FIG. 5A illustrates an ADC for a write head as described herein to the ADC of a write head of many cases. Replacing the front of the PBL by Rh can lead to a gradual degradation of the ADC of the hybrid PBL. At the target value of PBLh2=110 nm, (i.e., 80 nm Rh in front of the PBL), the ADC can be about 3% lower than the one in many cases, such as the PBL as shown in FIGS. 1A-B (e.g., a PBL structure). This slight degradation can be caused by the absorption of the surface plasmon in the Rh part while it travels along the PBL towards the ABS.

FIG. 5B is a graphical representation 500b of a peg temperature at a recording point for varying values of the BSDh and PBLh2. As shown in FIG. 5B, a first series of points 510a, 510b can include values for a BSDh with a first trendline 512 specifying a trend of values. Further, a second series of points 514a, 514b can include values for a PBLh2 with a second trendline 516 specifying a trend of values. The peg temperature can include an increase of around 5.9% for the hybrid PBL structure vs. the PBL structure at the target value of PBLh2=110 nm.

Figure 5D:
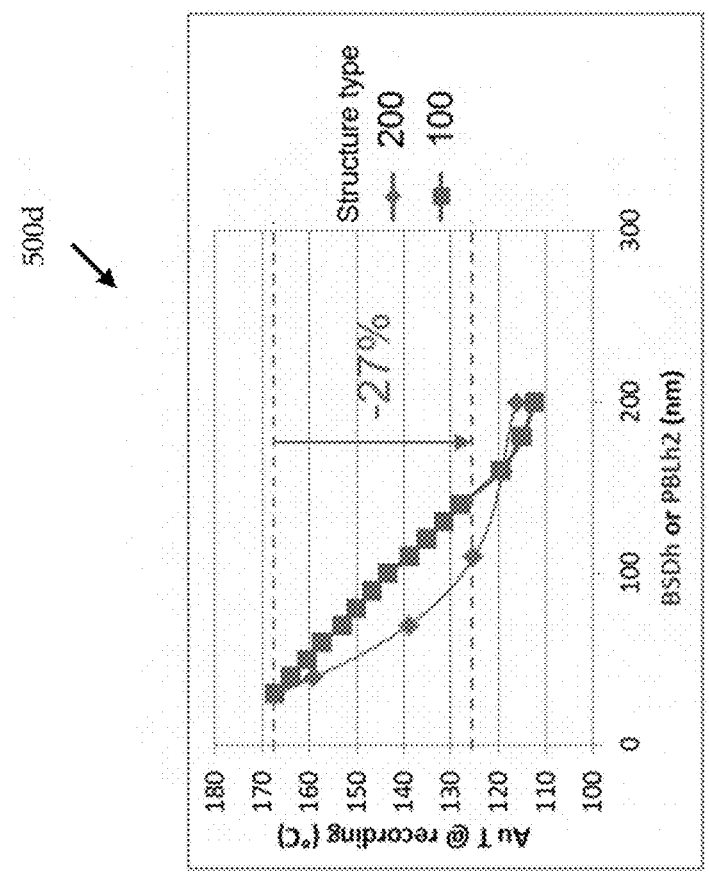
FIG. 5D is a graphical representation of an Au temperature at the recording point for varying values of BSDh and PBLh2 according to some embodiments.
Figure 5C:
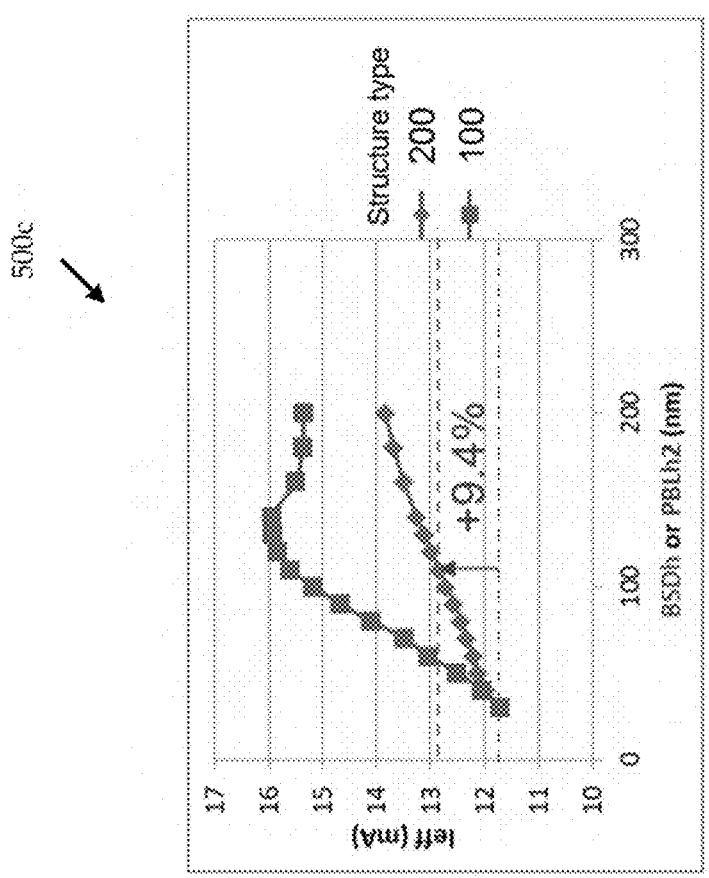
FIG. 5C is a graphical representation of a laser current (Ieff) for varying values of BSDh and PBLh2 according to some embodiments.

FIG. 5C is a graphical representation 500c of a laser current (Ieff) at a for varying values of the BSDh and PBLh2. As shown in FIG. 5C, a first series of points 518a, 518b can include values for a BSDh with a first trendline 520 specifying a trend of values. Further, a second series of points 522a, 522b can include values for a PBLh2 with a second trendline 524 specifying a trend of values. As shown in FIG. 5C, a laser current for a hybrid PBL structure can be 9.4% higher than that of the PBL structure at the target value of PBLh2=110 nm.

FIG. 5D is a graphical representation 500d of an Au temperature at a recording point for varying values of the BSDh and PBLh2. As shown in FIG. 5D, a first series of points 526*a*, 526*b* can include values for a BSDh with a first trendline 528 specifying a trend of values. Further, a second series of points 530*a*, 530*b* can include values for a PBLh2 with a second trendline 532 specifying a trend of values. As shown in FIG. 5D, an Au temperature in the hybrid PBL structure can drop by 27% compared to that in the PBL structure at the target value of PBLh2=110 nm.

A similar Au temperature can be achieved if the BSDh is set to around 140 nm, which may result in too great of a peg temperature, a high Ieff, and a large ADC loss.

The graphical illustrations in FIGS. 5A-5D can illustrate changes to other write heads (e.g., write heads implementing PBL structure), if the Au-PBL recesses from the ABS, which can be equivalent to an increase in BSDh. For example, the observed peg temperature increase of the hybrid PBL structure can already be reached when the BSDh in the many write heads increases by less than 10 nm.

Figure 6B:
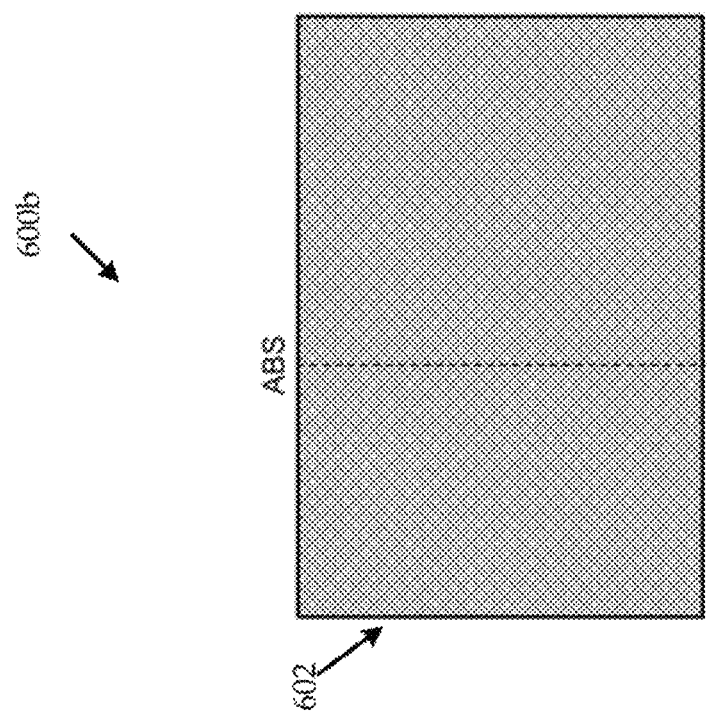
FIG. 6B is a top view of a NFT with an alumina layer deposited on top of a waveguide according to some embodiments.
Figure 6A:
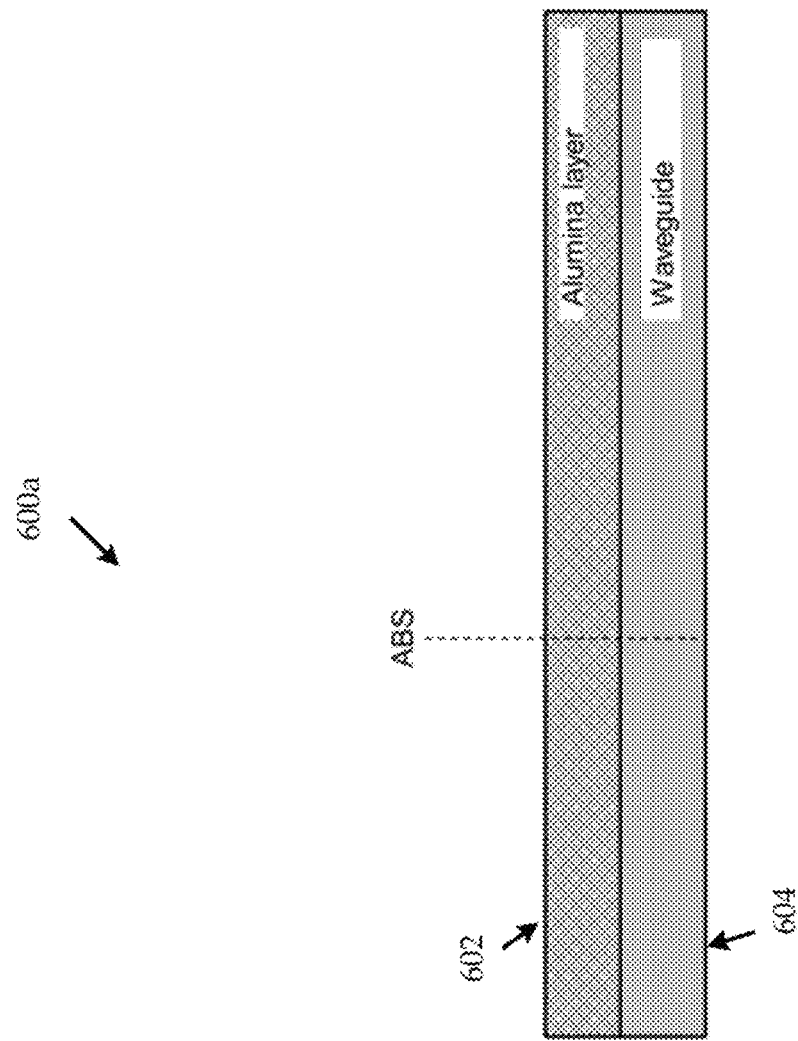
FIG. 6A is a cross-section view of a NFT with an alumina layer deposited on top of a waveguide according to some embodiments.

FIG. 6A is a cross-section view of a NFT 600*a* with an alumina layer 602 deposited on top of a waveguide 604. As shown in FIG. 6A, an alumina layer 602 can be disposed on top of a waveguide 604 via a deposition process (e.g., atomic layer deposition (ALD)). In some instances, the alumina layer 602 can be deposited after a WvG CMP process. FIG. 6B is a top view of a NFT 600*b* with an alumina layer 602 deposited on top of a waveguide. From the top view, the alumina layer 602 can be seen.

FIG. 7A is a cross-section view of a NFT 700*a* with an alumina layer after an IBE etching of the alumina layer. As shown in FIG. 7A, the alumina layer 702 can be etched using an ion beam etching (IBE) etching process. The etching process can define an etched portion 706 in the alumina layer 702.

In some instances, a photo resist (PR) can be coated on part of the alumina layer, which can define a shape of the opening. The IBE etching process can remove film not protected by a mask. A resist mask can be stripped, and a wall angle of the etched portion of the alumina layer can vary between 0 degrees and 60 degrees.

FIG. 7B is a top view of a NFT 700*b* with an alumina layer after an IBE etching of the alumina layer. As shown in FIG. 7B, the top view shows the alumina layer 702 as well as the etched portion 706 etched within the alumina layer.

Figures 8A, 8B:
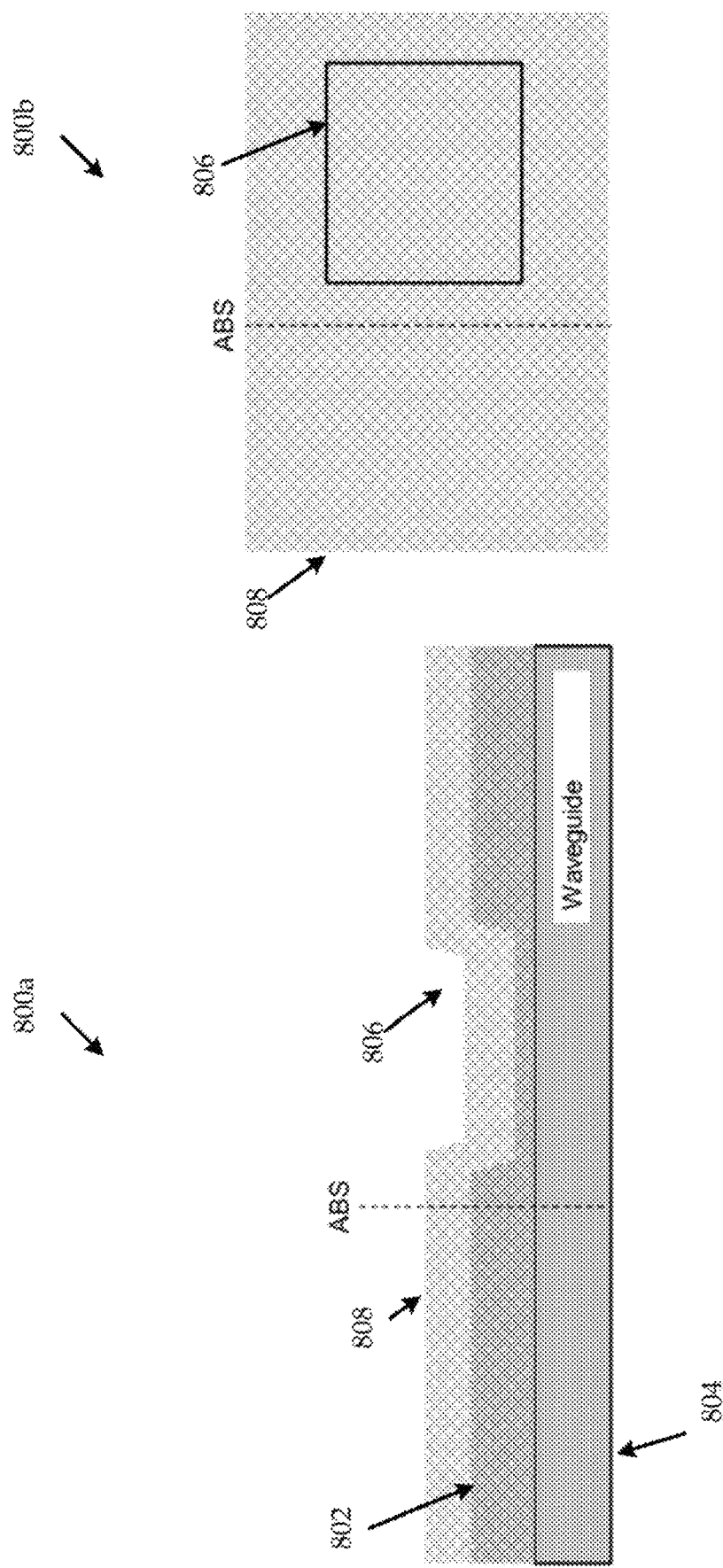
FIG. 8A is a cross-section view of a NFT with a full film deposition on top of the alumina layer according to some embodiments.
FIG. 8B is a top view of a NFT with a full film deposition on top of the alumina layer according to some embodiments.

FIG. 8A is a cross-section view of a NFT 800*a* with a full film deposition on top of the alumina layer. As shown in FIG. 8A, a film 808 can be added on top of the alumina layer 802. The film can include a Rh film. FIG. 8B is a top view of a NFT 800*b* with a full film deposition on top of the alumina layer. As shown in FIG. 8B, the film 808 can include the top layer of the NFT 800*b* including in the etched portion 806.

Figures 9A, 9B:
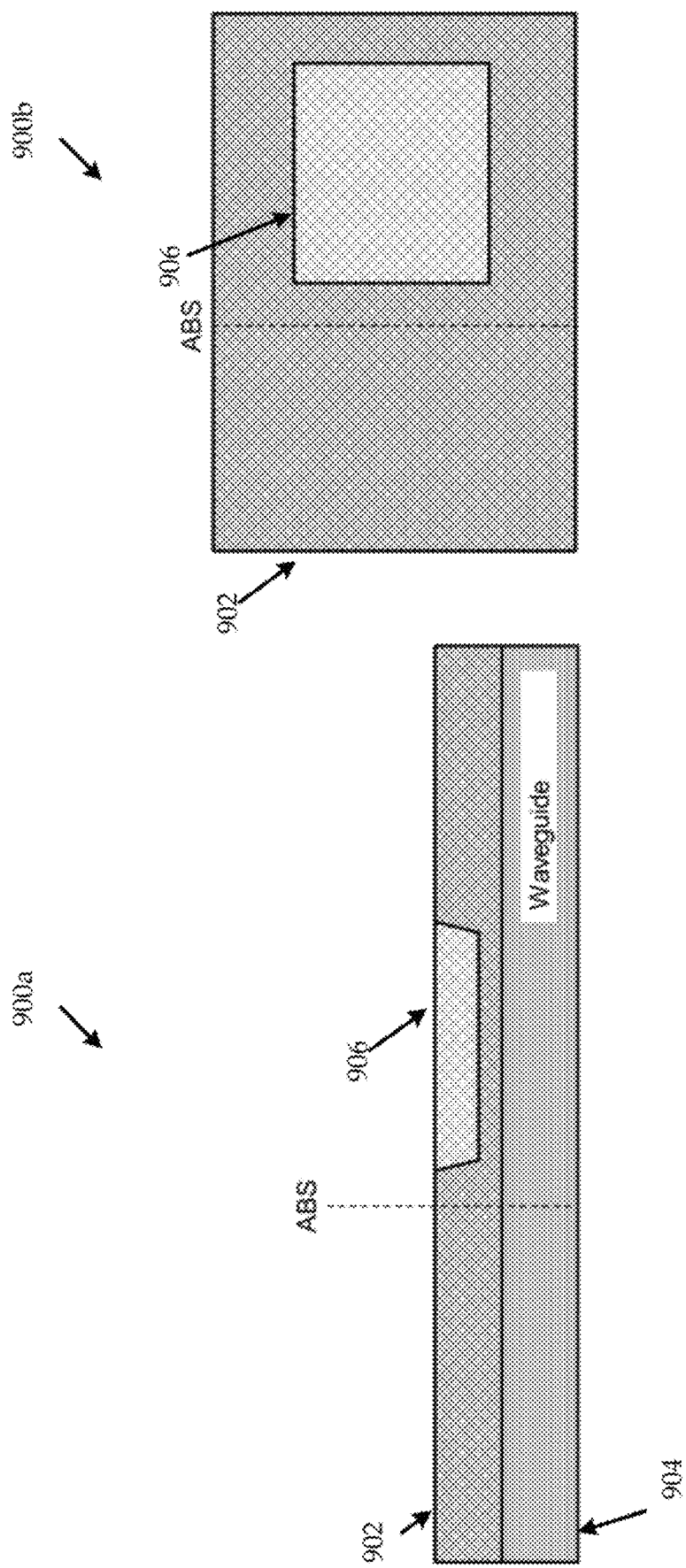
FIG. 9A is a cross-section view of an NFT after a field RH removal and CMP/IBE according to some embodiments.
FIG. 9B is a top view of an NFT after a field RH removal and CMP/IBE according to some embodiments.

FIG. 9A is a cross-section view of an NFT 900*a* after a field Rh removal and CMP/IBE. As shown in FIG. 9A, the etched portion 906 can be filled with the full film Rh after the full film (e.g., in FIG. 8A) is removed from a remainder of the top portion of the NFT 900*a*. The filled etched portion 902 can result in a flat surface along the alumina layer 902 with the alumina deposition, chemical mechanical polishing/planarization (CMP), and/or IBE etching. FIG. 9B is a top view of an NFT 900*b* after a field Rh removal and CMP/IBE. As shown in FIG. 9B, the alumina layer 902 can be seen as the top layer. Further, the etched portion 906 can include the film (e.g., film 808 as shown in FIG. 8A).

FIG. 10A is a cross-section view of an NFT 1000*a* with a photoresist being patterned to define a final Rh length. As shown in FIG. 10A, a photoresist layer 1012 can be coated on a portion of the alumina layer 1002. The photoresist 1012 can define a final position of Rh layer. In some instances, the portion of the alumina layer including the etched portion 1006 may not include the photoresist 1012, thereby exposing the etched portion 1006 comprising the film (e.g., film 808). FIG. 10B is a top view of an NFT 1000*b* with a photoresist being patterned to define a final Rh length. As shown in FIG. 10B, the photoresist 1012 can comprise a top layer, with the film in the etched portion 1006 being exposed as part of the top layer.

Figure 11B:
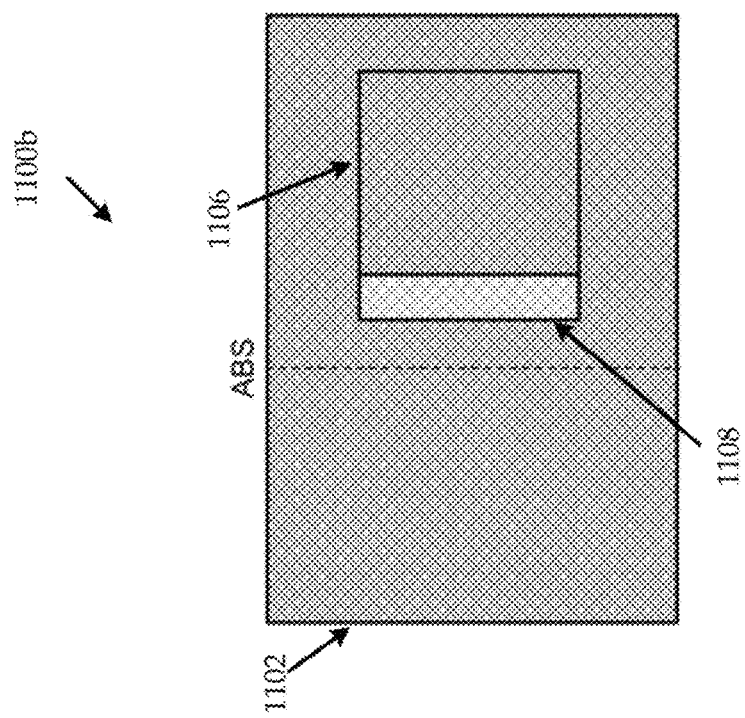
FIG. 11B is a top view of an NFT with the IBE process applied to pattern the Rh and the photoresist being stripped according to some embodiments.
Figure 11A:
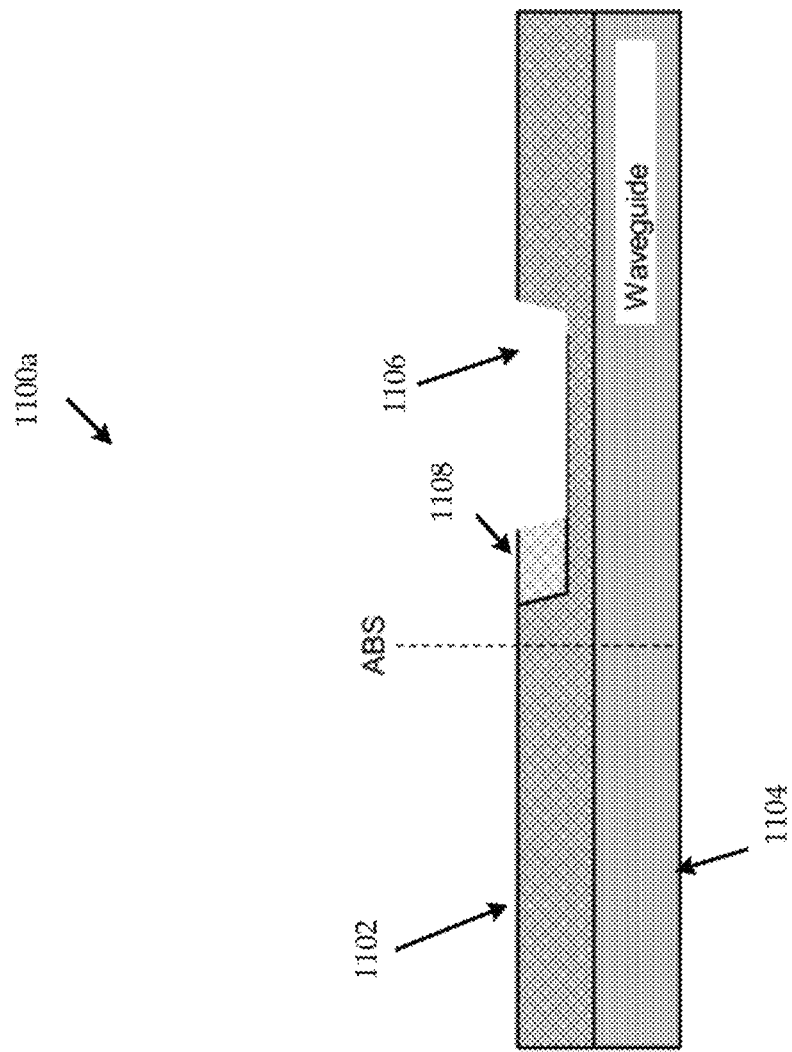
FIG. 11A is a cross-section view of an NFT with the IBE process applied to pattern the Rh and the photoresist being stripped according to some embodiments.

FIG. 11A is a cross-section view of an NFT 1100*a* with the IBE process applied to pattern the Rh and the photoresist being stripped. As shown in FIG. 11A, the photoresist (e.g., 1012) can be removed, and a portion of the film (e.g., 808) can be removed from the etched portion 1106 such that only a portion of the film 1108 remains in the etched portion 1106. An etching process (e.g., IBE) can be applied to remove the Rh film not protected by a mask. The resist mask can then be stripped. The Rh wall angle can be varied between 10 degrees and 60 degrees.

FIG. 11B is a top view of an NFT 1100*b* with the IBE process applied to pattern the Rh and the photoresist being stripped. As shown in FIG. 11B, the alumina layer 1102 can include a top layer for a portion of the NFT 1100*b*. The etched portion 1106 can include a first portion exposing the alumina layer 1102 and a second portion exposing the remaining film (e.g., 808) 1108.

FIG. 12A is a cross-section view of an NFT 1200*a* with a full film Au layer being deposited on top of the alumina layer. The full film Au layer 1208 can be deposited across an entirety of the alumina layer 1202 including the etched portion 1206. FIG. 12B is a top view of an NFT 1200*b* with a full film Au layer being deposited on top of the alumina layer. As shown in FIG. 12B, the Au layer 1208 can be disposed across the top portion of the NFT 1200*b*.

Figure 13B:
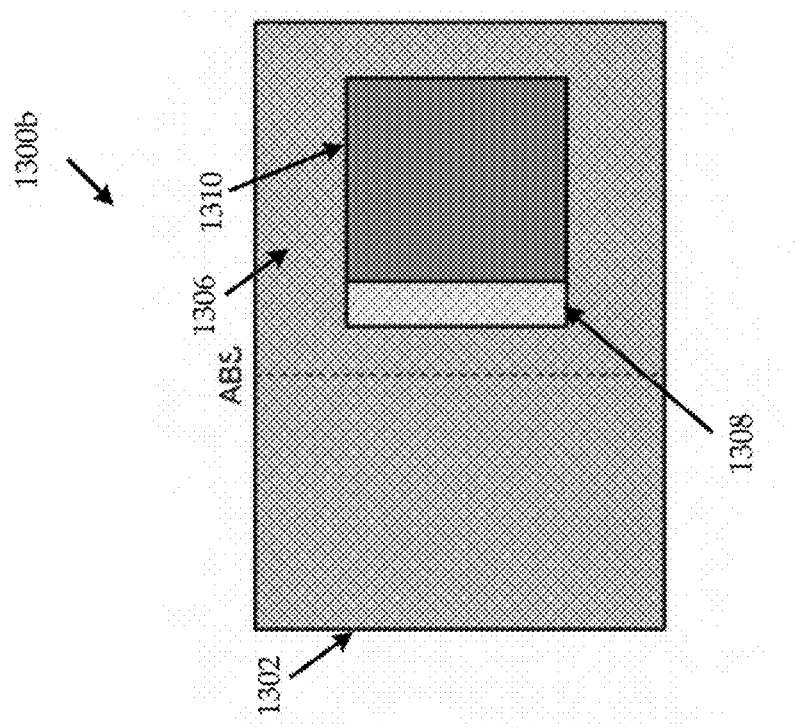
FIG. 13B is a top view of an NFT after the Au layer is removed according to some embodiments.
Figure 13A:
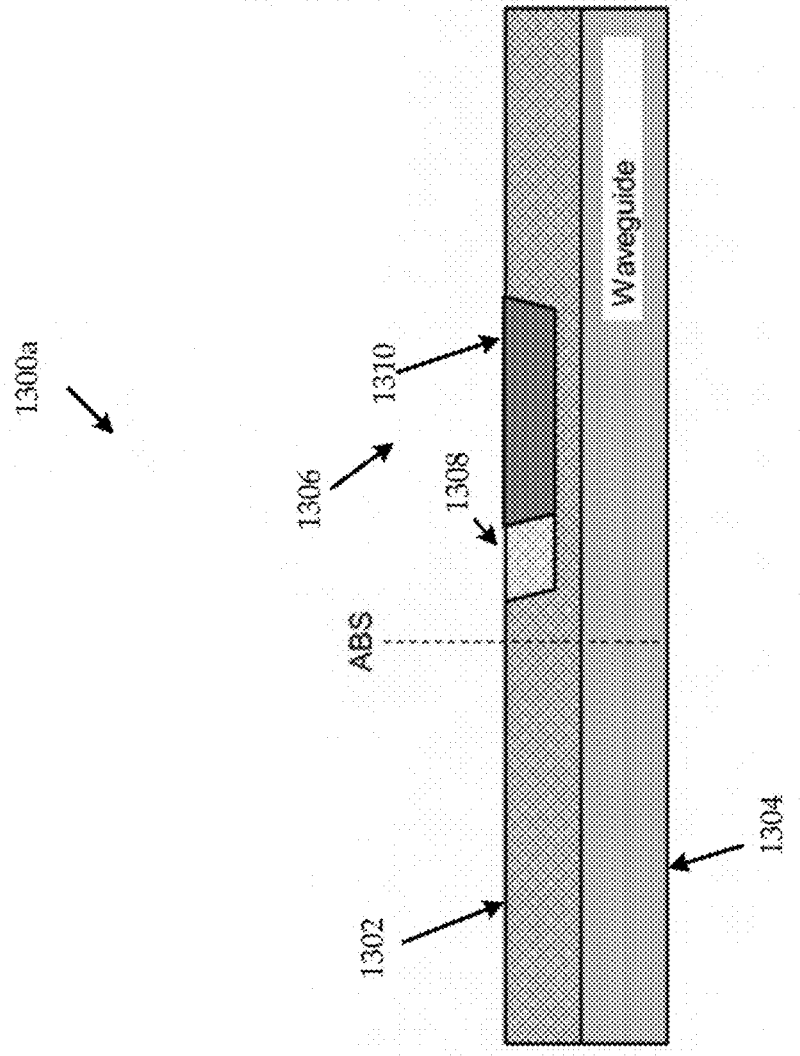
FIG. 13A is a cross-section view of an NFT after the Au layer is removed according to some embodiments.

FIG. 13A is a cross-section view of an NFT 1300*a* after the Au layer is removed. As shown in FIG. 13A, the full Au layer (e.g., 1208) can be removed and a CMP/IBE process can be implemented to achieve a flat surface. For instance, the etched portion 1306 include a portion 1310 comprising a remaining part of the Au layer (e.g., 1208) and a second portion 1308 comprising the film (e.g., 808). The Au layer can be removed by an SiO2 deposition, CMP, and/or IBE, for example.

FIG. 13B is a top view of an NFT 1300*b* after the Au layer is removed. As shown in FIG. 13B, at least a portion of the top surface can include the alumina layer 1302. Further, the etched portion 1306 can include a first portion 1310 comprising the Au layer and a second portion 1308 comprising the film.

Figure 14B:
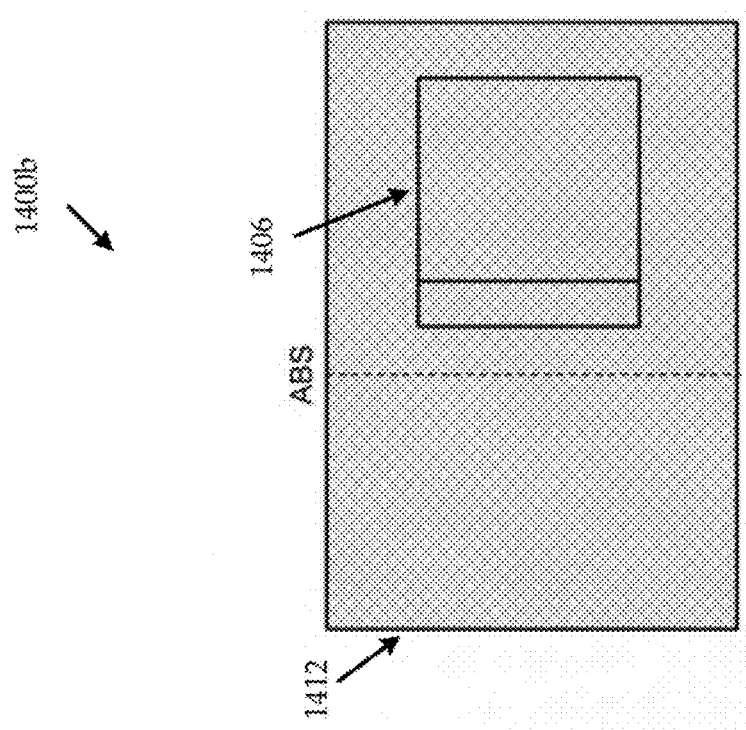
FIG. 14B is a top view of an NFT with a full film Rh deposition according to some embodiments.
Figure 14A:
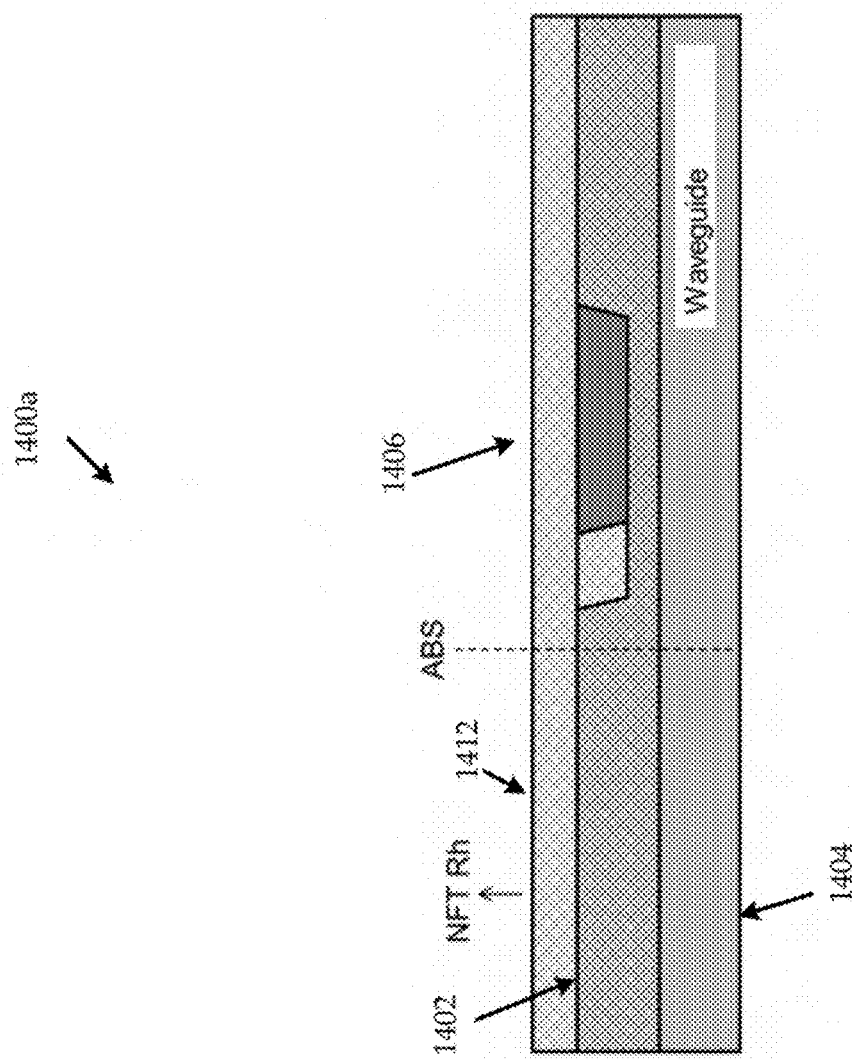
FIG. 14A is a cross-section view of an NFT with a full film Rh deposition according to some embodiments.

FIG. 14A is a cross-section view of an NFT 1400*a* with a full film Rh deposition. As shown in FIG. 14A, the Rh layer 1412 can be disposed above the alumina layer 1402 and the etched portion 1406. The Rh layer 1412 can comprise a flat surface. FIG. 14B is a top view of an NFT 1400*b* with a full film Rh deposition. As shown in FIG. 14B, an entirety of the top layer can include the Rh layer 1412.

Figures 15A, 15B:
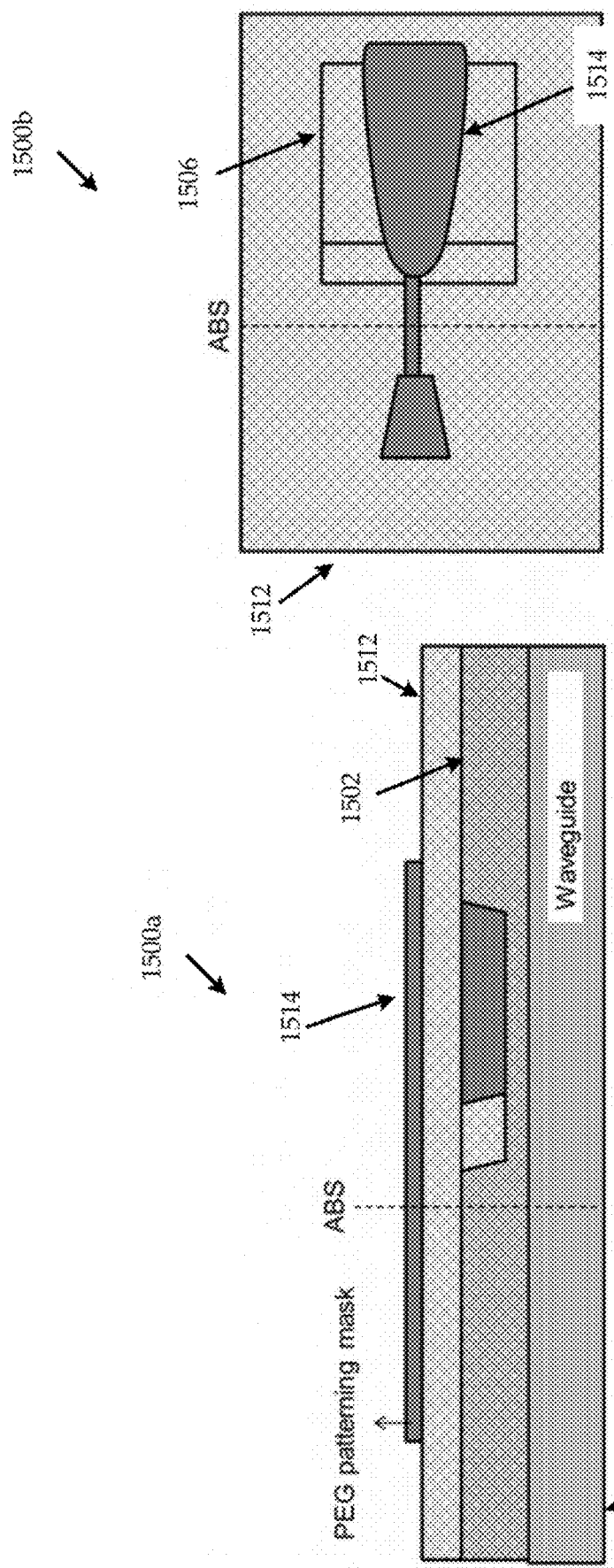
FIG. 15A is a cross-section view of an NFT with a photolithography patterning process applied according to some embodiments.
FIG. 15B is a top view of an NFT with a photolithography patterning process applied according to some embodiments.

FIG. 15A is a cross-section view of an NFT 1500*a* with a photolithography patterning process applied. As shown in FIG. 15A, a peg patterning mask 1514 can be disposed above the Rh layer 1512. A photolithography patterning process can be used to apply the peg patterning mask 1514. After this process, the final NFT shape can be defined by the mask design as provided in the peg patterning mask 1514.

FIG. 15B is a top view of an NFT 1500*b* with a photolithography patterning process applied. As shown in FIG. 15B, the peg patterning mask 1514 can provide a design for the NFT. The peg patterning mask 1514 can be disposed above the Rh layer 1512.

Figure 16B:
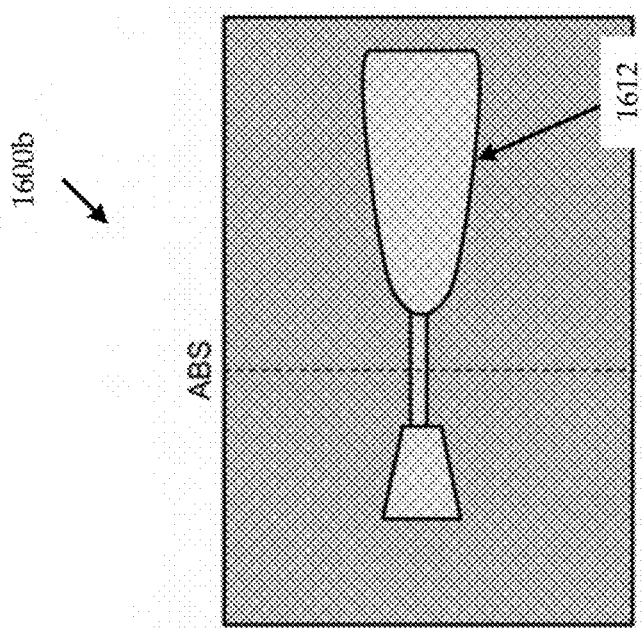
FIG. 16B is a top view of an NFT after an etching process being applied to remove a portion of the Rh layer according to some embodiments.
Figure 16A:
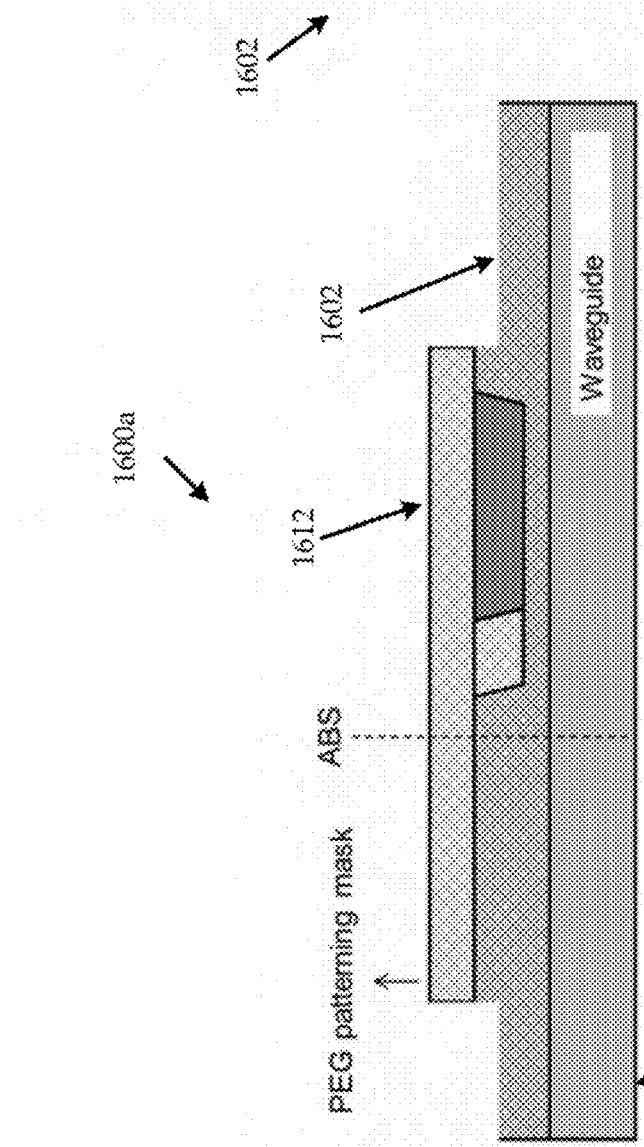
FIG. 16A is a cross-section view of an NFT after an etching process being applied to remove a portion of the Rh layer according to some embodiments.

FIG. 16A is a cross-section view of an NFT 1600a after an etching process being applied to remove a portion of the Rh layer. As shown in FIG. 16A, portions of the Rh layer 1612 can be removed. After the etching process, the region of the film below the mask (e.g., 1612) can be left to provide the design of the mask. At least a portion of the alumina layer 1602 may not be protected by the mask. The mask can be removed after a dry etching patterning process is performed.

FIG. 16B is a top view of an NFT after an etching process being applied to remove a portion of the Rh layer. As shown in FIG. 16B, the alumina layer 1602 can be exposed at the top layer. Further, a portion of the Rh layer 1612 previously below the peg patterning mask (e.g., 1514) can be exposed in a design provided by the mask.

Figure 17B:
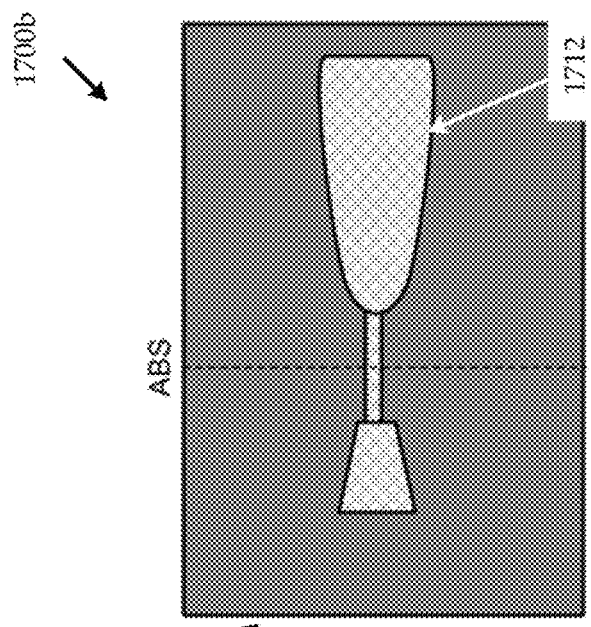
FIG. 17B is a top view of an NFT with a cladding material added according to some embodiments.
Figure 17A:
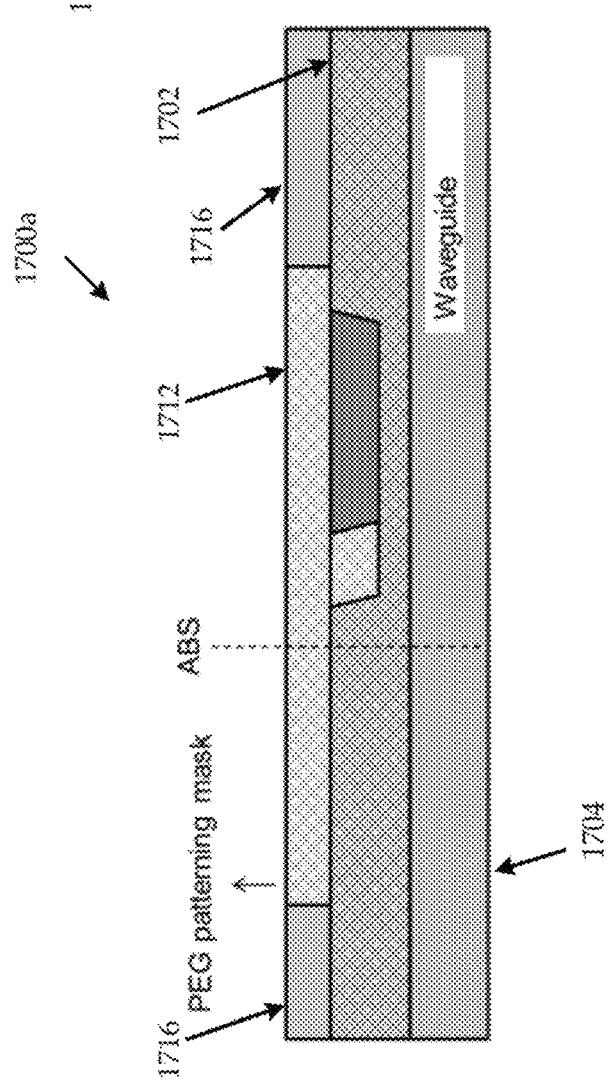
FIG. 17A is a cross-section view of an NFT with a cladding material added according to some embodiments.

FIG. 17A is a cross-section view of an NFT 1700a with a cladding material added. As shown in FIG. 17A, a cladding material 1716 can be added above the alumina layer 1702 to provide a flat surface at the top layer. The cladding material 1716 can include an ALD or a PECVD SiO2 material. The cladding material deposition can be performed after a CMP planarization process to finish the NFT fabrication process. As shown in FIG. 17A, the cladding material 1716 can be disposed around the Rh layer 1712 at a top layer of the NFT 1700a.

FIG. 17B is a top view of an NFT 1700b with a cladding material added. As shown in FIG. 17B, at least a portion of the top layer can include the cladding material 1716. The top layer can further include the portion of the remaining Rh layer 1712 as designed by the mask. In embodiments, the cladding layers are made of $Al_2O_3$ or $SiO_2$, for example.

In a first example embodiment, a thermally-assisted magnetic recording (TAMR) write head is provided. The TAMR write head can include a main pole (e.g., 102). The main pole can include a tip portion disposed adjacent to an air-bearing surface (ABS). The ABS can include a surface adjacent to a disk (e.g., disk 103). The main pole can be configured to direct a magnetic field toward a magnetic recording medium to interact with the magnetic recording medium (e.g., to write to the disk). The TAMR head can further include a heat sink (e.g., 104) disposed adjacent to the main pole.

The TAMR head can further include a near field transducer (NFT). The NFT can include a first layer (e.g., 108) and a second layer (e.g., 202). The first layer (e.g., 108) can include a first plasmonic material (e.g., a robust, but still mildly plasmonic material such as rhodium, iridium, platinum). Further, the first layer can be disposed adjacent to the heat sink.

In some instances, a plasmonic material that is "mild" or "good" can be defined by a plasmon quality factor (PQF). The PQF can be defined as a ratio given by the real part of the dielectric function divided by the imaginary part of the dielectric function. A more negative PQF can specify a better plasmonic material. Materials with a PQF around −1 are considered mildly plasmonic while materials with a PQF around −10 and smaller are considered good plasmonic materials. "Robust" or "thermally stable" plasmonic materials can be specified by the melting temperature of the materials. A higher melting temperature can define a more robust material.

The second layer (e.g., 202) can include a portion of a second plasmonic material (e.g., a good plasmonic metallic material such as gold) and a first plasmonic portion (e.g., a robust, but still mildly plasmonic material such as rhodium). The second plasmonic portion of the second layer can be disposed adjacent to the ABS.

In some instances, the NFT can include an alumina layer (e.g., 112) disposed between the waveguide and the second layer of the near field transducer. The alumina layer can include an etched recess recessed into the alumina layer. The etched recess can be etched into the alumina layer via an etching process (e.g., IBE).

The second layer can be disposed within the etched recess in the alumina layer. The robust metallic material can be deposited in the etched recess responsive to a removal of a robust metallic material film disposed over the alumina layer. A second portion of the etched recess can include the second plasmonic portion of the second layer. Further, the second plasmonic portion can be deposited in the etched recess responsive to a removal of a second plasmonic material film disposed over the alumina layer.

The TAMR head can further include a waveguide (e.g., 114) configured to direct a laser light source (e.g., generated from a laser (not shown)) to heat a portion of the magnetic recording medium.

In some instances, the first layer can be defined by a patterning mask added above the first layer. For instance, a portion of the first layer can be removed according to the patterning mask. The patterning mask can be removed, and the patterning mask can define a final shape of the near field transducer.

In another example embodiment, a method for manufacturing a near field transducer that is part of a thermally-assisted magnetic recording (TAMR) write head is provided. The method can include disposing an alumina layer above a waveguide. For example, in FIG. 6A, an alumina layer 602 can be disposed above a waveguide 604.

The method can further include forming an etched recess in the alumina layer via an etching process. For example, an etched recess 706 can be formed in the alumina layer 702, as shown in FIG. 7A. In some instances, the etching process comprises an ion beam etching (IBE) etching process.

The method can further include disposing a first plasmonic material in a first portion of the etched recess. For example, as shown in FIG. 8A, a full film of the first plasmonic material (e.g., film 808) can be disposed above the alumina layer. Further, as shown in FIG. 9A, a portion of the film (e.g., 808) can be removed such that only the robust material remains in the etched recess (e.g., Rh material included in etched recess 906).

In some instances, the method can further include disposing a photo-resist layer (e.g., 1012 as shown in FIG. 10A) above the alumina layer. The photo-resist layer can define a length of the first layer. Further, the photo-resist layer can be removed, where the removing of the photo-resist layer removes part of the first plasmonic material remaining in the etched recess to expose the second portion of the etched recess. For example, it is shown in etched recess 1106 in FIG. 11A, where only a portion of the Rh film 1108 remains in the etched recess 1106 and a remaining portion of the etched recess is exposed.

The method can further include disposing a second plasmonic material in a second portion of the etched recess. The first plasmonic material and the second plasmonic material comprise a second layer of the near field transducer. For example, as shown in FIG. 12A, a full film of the second plasmonic material 1208 can be disposed above the alumina layer 1202. Further, a portion of the full film of the second plasmonic material can be removed such that the second plasmonic material remains only in the second portion of the etched recess. For instance, as shown in FIG. 13A, the Au film 1310 can remain in the second portion of the etched recess 1306.

The method can further include disposing a first layer comprising the first plasmonic material above the alumina layer and the etched recess. For example, in FIG. 14A, the Rh layer 1406 can be disposed above the alumina layer and the etched recess.

In some embodiments, a patterning mask (e.g., 1514 in FIG. 15A) can be disposed above the first layer. The patterning mask can define a final shape of the near field transducer. Further, a portion of the first layer not below the patterning mask can be removed (e.g., as shown in FIG. 16A).

Further, in some embodiments, the method can include disposing a cladding material adjacent to the first layer such that the first layer and the cladding material form a flat surface. For example, cladding material 1716 can be disposed around the portion of the first layer that was removed such that a top surface of the NFT can be flat.

In another example embodiment, a near field transducer (NFT) is provided. The NFT can include a first layer comprising a first plasmonic material (e.g., rhodium, iridium, platinum). The first layer can be disposed adjacent to the heat sink. In some instances, the first layer is defined by a patterning mask added above the first layer. The patterning mask can define a final shape of the near field transducer.

The NFT can also include a second layer that can include a second plasmonic portion (e.g., comprising gold) and a first plasmonic portion (e.g., comprising rhodium, iridium, or platinum). The first plasmonic portion can be disposed adjacent to the ABS. The NFT can further include a waveguide.

In some instances, the NFT can include an alumina layer disposed between the waveguide and the second layer of the near field transducer. The alumina layer can include an etched recess formed into the alumina layer via an etching process. The second layer can be disposed within the etched recess.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A thermally-assisted magnetic recording (TAMR) write head comprising:
    a main pole including a tip portion disposed adjacent to an air-bearing surface (ABS), the main pole configured to direct a magnetic field toward a magnetic recording medium to interact with the magnetic recording medium;
    a heat sink disposed adjacent to the main pole; and
    a near field transducer comprising:
        a first layer comprising a first plasmonic material, the first layer disposed adjacent to the heat sink;
        a second layer including a second plasmonic portion and a first plasmonic portion;
        a waveguide configured to direct a laser light source to heat a portion of the magnetic recording medium; and
        an alumina layer disposed between the waveguide and the second layer of the near field transducer, wherein the alumina layer comprises an etched recess recessed into the alumina layer.

2. The TAMR write head of claim 1, wherein the first plasmonic portion comprises any of rhodium, iridium, or platinum, and wherein the second plasmonic portion comprises gold.

3. The TAMR write head of claim 1, wherein the first portion of the second layer is disposed adjacent to the ABS.

4. The TAMR write head of claim 1, wherein the etched recess is etched into the alumina layer via an etching process.

5. The TAMR write head of claim 4, wherein a first portion of the etched recess includes the first plasmonic material of the second layer, wherein the first plasmonic material is deposited in the etched recess responsive to a removal of a first plasmonic material film disposed over the alumina layer.

6. The TAMR write head of claim 4, wherein a second portion of the etched recess includes the second plasmonic portion of the second layer, wherein the second plasmonic portion is deposited in the etched recess responsive to a removal of a second plasmonic material film disposed over the alumina layer.

7. The TAMR write head of claim 6, wherein the first layer is defined by a patterning mask added above the first layer, wherein a portion of the first layer is removed according to the patterning mask, and wherein the patterning mask is removed, the patterning mask defining a final shape of the near field transducer.

8. A method for manufacturing a near field transducer that is part of a thermally-assisted magnetic recording (TAMR) write head, the method comprising:
    disposing an alumina layer above a waveguide;
    forming an etched recess in the alumina layer via an etching process;
    disposing a first plasmonic material in a first portion of the etched recess;
    disposing a second plasmonic material in a second portion of the etched recess, wherein the first plasmonic material and the second plasmonic material comprise a second layer of the near field transducer; and
    disposing a first layer comprising the first plasmonic material above the alumina layer and the etched recess.

9. The method of claim 8, wherein the etching process comprises an ion beam etching (IBE) etching process.

10. The method of claim 8, further comprising:
disposing a full film of the first plasmonic material above the alumina layer; and
removing a portion of the full film of the first plasmonic material such that only the first plasmonic material remains in the etched recess.

11. The method of claim 10, further comprising:
disposing a photo-resist layer above the alumina layer, the photo-resist layer defining a length of the first layer; and
removing the photo-resist layer, wherein the removing of the photo-resist layer removes part of the first plasmonic material remaining in the etched recess to expose the second portion of the etched recess.

12. The method of claim 11, further comprising:
disposing a full film of the second plasmonic material above the alumina layer; and
removing a portion of the full film of the second plasmonic material such that the second plasmonic material remains only in the second portion of the etched recess.

13. The method of claim 12, further comprising:
disposing a patterning mask above the first layer, the patterning mask defining a final shape of the near field transducer; and
removing a portion of the first layer not below the patterning mask.

14. The method of claim 13, further comprising:
disposing a cladding material adjacent to the first layer such that the first layer and the cladding material form a flat surface.

15. A near-field transducer comprising:
a first layer comprising a first plasmonic material, the first layer disposed adjacent to a heat sink;
a second layer including a second plasmonic portion and a first plasmonic portion, the first plasmonic portion disposed adjacent to an air-bearing surface (ABS);
a waveguide; and
an alumina layer disposed between the waveguide and the second layer, wherein the alumina layer comprises an etched recess recessed into the alumina layer.

16. The near-field transducer of claim 15, wherein the first plasmonic material comprises any of rhodium, iridium, or platinum, and wherein the second plasmonic material comprises gold.

17. The near-field transducer of claim 15, wherein the second layer is disposed within the etched recess.

18. The near-field transducer of claim 15, wherein the first layer is defined by a patterning mask added above the first layer, the patterning mask defining a final shape of the near field transducer.

* * * * *